(12) United States Patent
Hirakawa

(10) Patent No.: US 11,491,929 B2
(45) Date of Patent: Nov. 8, 2022

(54) BINDING STRUCTURE OF WIRE HARNESS

(71) Applicant: DAIWA KASEI INDUSTRY CO., LTD., Okazaki (JP)

(72) Inventor: Katsuya Hirakawa, Okazaki (JP)

(73) Assignee: DAIWA KASEI INDUSTRY CO., LTD., Okazaki (JP)

(*) Notice: Subject to any disclaimer, the term of this patent is extended or adjusted under 35 U.S.C. 154(b) by 25 days.

(21) Appl. No.: 17/361,676

(22) Filed: Jun. 29, 2021

(65) Prior Publication Data

US 2022/0041121 A1 Feb. 10, 2022

(30) Foreign Application Priority Data

Aug. 7, 2020 (JP) .............................. JP2020-134638

(51) Int. Cl.
*H02G 3/04* (2006.01)
*B60R 16/02* (2006.01)

(52) U.S. Cl.
CPC ........... *B60R 16/0215* (2013.01); *H02G 3/04* (2013.01)

(58) Field of Classification Search
CPC .............................. B60R 16/0215; H02G 3/04
USPC ....................................... 174/72 A
See application file for complete search history.

(56) References Cited

U.S. PATENT DOCUMENTS

| 5,739,470 A * | 4/1998 | Takeda ................. H02G 3/0487 174/101 |
| 2011/0162885 A1* | 7/2011 | Yamaguchi .......... H02G 3/0487 174/72 A |
| 2019/0148924 A1* | 5/2019 | Hara .................... H02G 3/0406 174/72 A |
| 2019/0267785 A1* | 8/2019 | Gintz ................... H02G 3/0487 |

FOREIGN PATENT DOCUMENTS

JP 2004-236447 A 8/2004

* cited by examiner

*Primary Examiner* — Timothy J Thompson
*Assistant Examiner* — Michael F McAllister
(74) *Attorney, Agent, or Firm* — McClure, Qualey & Rodack, LLP

(57) ABSTRACT

A wire harness having a round cross-section, a clamp that has an engagement portion for attachment to a vehicle body, a placement portion on which the wire harness is placed, and a pressing portion for pressing the wire harness, and a binding member are used. The pressing portion has pressing body portions opposing in a longitudinal direction of the wire harness, and opposing extending portions for joining the pressing body portions, and can be provisionally combined with the placement portion in a state where the wire harness is pressed to have a reduced height. In the provisionally combined state, the wire harness in the low height state, the placement portion, and the opposing extending portions are bound between the pressing body portions opposing each other.

10 Claims, 19 Drawing Sheets

BINDING STRUCTURE OF WIRE HARNESS

RELATED APPLICATIONS

This application claims the priority of Japanese Patent Application No. 2020-134638 filed on Aug. 7, 2020. The disclosure of the prior application is hereby incorporated herein in the entirety by reference.

BACKGROUND OF THE INVENTION

Field of the Invention

This invention relates to a binding structure of a wire harness.

Description of Related Art

For vehicles, a clamp in which a grip portion for gripping a wire harness and an engagement portion for combining with a vehicle body are integrated is used in order to fix the wire harness to the vehicle body. The clamp with the wire harness is bound and held by a binding member such as tape, and the engagement portion is inserted in a fixing hole of the vehicle body in the bound and held state, to combine the clamp and the wire harness with the vehicle body.

The wire harness is a wiring bundle formed of multiple wires including a signal line, a power supply line, and the like, is bound and held by tape or the like, and has a substantially round cross-section. Such a wire harness is widely used in vehicles at present. In recent years, a structure that allows routing of the wire harness in a state where the wire harness has a further reduced height is desired in order to assuredly maintain a wider vehicle interior space.

Japanese Laid-Open Patent Publication No. 2004-236447 describes a routing structure that allows a wire harness to be deformed and flattened and to thus have a reduced height. However, at present, a height of a wire harness is required to be reduced in an elongated section in the longitudinal direction of the wire harness by using one clamp. Therefore, in the clamp, a portion for gripping the wire harness is considered to be elongated in the longitudinal direction of the wire harness. However, simple elongation of the portion may wastefully increase use of a lot of materials.

An object of this invention is to achieve a novel binding structure of a wire harness for allowing the wire harness having a round cross-section to stably have a reduced height in a wider range in the longitudinal direction of the wire harness with less waste.

SUMMARY OF THE INVENTION

A binding structure of a wire harness for solving the aforementioned problem includes:

a wire harness having a round cross-section;

a clamp having an engagement portion for attachment to a vehicle body, the clamp configured to press-deform the wire harness and press-expand the wire harness in a lateral width direction to grip the wire harness in a state where the wire harness has a reduced height in a height direction; and a binding member configured to bind and hold a part of the clamp and the wire harness having been gripped.

The clamp includes a plate-shaped placement portion having a placement surface on which the wire harness is placed, the placement surface having a width greater than a width of the wire harness in the lateral width direction, and a pressing portion having a pair of pressing body portions that extend such that the wire harness placed on the placement surface is disposed between the pressing body portions, that are disposed so as to oppose each other in a longitudinal direction, and that press the wire harness against the placement surface and hold the wire harness to form a low height state where a height of the wire harness is reduced by press-expanding the wire harness on the placement surface in the lateral width direction, and opposing extending portions extending from the pair of pressing body portions so as to approach.

The binding member binds the wire harness in the low height state, the placement portion, and the opposing extending portions between the pair of pressing body portions opposing each other.

In the configuration of this invention, the wire harness is pressed against the placement surface by the binding member and the two pressing body portions, whereby the wire harness is press-expanded in the lateral width direction to enter the low height state (flattened state) where the wire harness has a reduced height in the height direction, and the low height state is maintained by a binding force of the binding member. Thus, the wire harness can be maintained in the low height state formed widely over a long section including pressing sections in which the wire harness is pressed by the two pressing body portions and a binding section of the binding member between the pressing sections. The opposing extending portions are merely formed between the two pressing body portions opposing each other. Therefore, in the pressing portion, the pressing body portions are not simply formed widely in the longitudinal direction of the wire harness, but also unnecessary portions are eliminated. Furthermore, a binding force of the binding member for maintaining the low height state, that is, a pressing force of the binding member for pressing the wire harness against the placement surface is also effectively transmitted to the two pressing body portions through the opposing extending portions.

Furthermore, in the configuration of this invention, in a case where the binding member is a tape member having an adhesive surface on one of main surfaces, an area in which the tape member and the wire harness are adhered to each other can be widened in the lateral width direction when the wire harness is bound, in a structure for binding the opposing extending portions between the two pressing body portions opposing each other. Therefore, the wire harness can be prevented from being displaced in the longitudinal direction.

The wire harness of this invention is a wiring bundle formed of multiple wires, and has a round cross-section. The wire harness of this invention is different from, for example, a flat cable and flat-plate-shaped wiring that originally have low heights.

The binding structure of the wire harness of this invention is not for use in a flat cable and flat-plate-shaped wiring instead of the wire harness. However, the binding structure of the wire harness of this invention may also be used for the flat cable and the flat-plate-shaped wiring as necessary.

The clamp may include a provisionally combining portion for forming a provisionally combined state where the placement portion and the pressing portion that grip the wire harness in the low height state are provisionally combined with each other, and a height changing portion capable of changing a height from the placement surface to the pressing portion.

The binding member may bind the wire harness in the low height state, the placement portion, and the opposing extending portions in the provisionally combined state, to prohibit the height changing portion from changing the height.

In this configuration, the wire harness having the round cross-section is held by the placement portion and the pressing portion of the clamp to form the provisionally combined state, whereby the low height state (flattened state) can be easily formed and maintained. Furthermore, in the provisionally combined state, the succeeding binding work by the binding member is facilitated. Furthermore, the height changing portion is disposed, whereby the height of a space, between the pressing portion and the placement portion, in which the wire harness is stored can be changed. Therefore, the provisional combining work is facilitated, and wire harnesses having various thicknesses can be addressed by changing the heights. The height is prohibited from being changed by binding of the binding member, and the wire harness can be maintained to have the lowest height by the binding force. That is, the wire harness is deformed not for having a predetermined low height but for minimizing the height to maintain the state.

The height changing portion may have a flexible joining portion for joining the placement portion and the pressing portion at one end side in the lateral width direction.

The provisionally combining portion may have a combining portion for combining the placement portion and the pressing portion at another end side in the lateral width direction.

The wire harness, in the low height state, held between the placement portion and the pressing portion by the combining may be held so as not to fall from the placement surface.

In this configuration, the pressing portion and the placement portion are joined to each other at one end side, and combined with each other at the other end side. Therefore, the pressing portion is pivoted about the one end side, serving as a pivot, at which the pressing portion and the placement portion are joined, and the pressing portion is moved close to the placement portion at the other end, thereby easily forming the provisionally combined state, and, further, simultaneously facilitating reduction of the height by pressing the wire harness.

The opposing extending portions may serve as a bridging portion for joining the paired pressing portions opposing each other in the longitudinal direction. In this configuration, the pressing portion having the two pressing body portions can be formed as one member, thereby facilitating the provisional combining work and the like.

The pressing portion may have a protrusion that protrudes toward the placement surface from a pressing surface of each of the pressing body portions for pressing the wire harness. In this configuration, the protrusion of the pressing portion can be intruded onto the wire harness in the provisionally combined state, and the wire harness can be more strongly pressed onto the placement portion. Furthermore, the wire harness in the low height state can be prevented from being displaced in the lateral width direction, by intrusion of the protrusion.

In the opposing extending portions, an outer surface on a side opposite to an inner surface disposed on a pressing side on which the wire harness is pressed may be disposed, in the height direction, at a same position as a surface disposed at an end portion, on the opposing extending portion side in the lateral width direction, of a pressing surface of each of the pressing body portions for pressing the wire harness. For example, the outer surface of the opposing extending portion can be disposed on a continuous surface (for example, the coplanar surface with the pressing surface) continuous from the pressing surface of the pressing body portion for pressing the wire harness. In this configuration, in the binding structure of the wire harness, the height is not increased in a section through which the binding member passes on the opposing extending portion, thereby contributing to reduction of the height. Furthermore, if the outer surface of the opposing extending portion is disposed closer to the side opposite to the placement surface than the pressing surface of the pressing body portion is, when a binding member such as tape having an adhesive surface on the back surface is wound, the binding member is adhered to (in close contact with) the outer surface of the opposing extending portion but is not adhered to the outer surface region of the wire harness adjacent to both sides of the outer surface of the opposing extending portion, and is raised. In the above-described configuration, the binding member can be adhered to (in close contact with) the outer surface region without raising the binding member, and binding and holding can be more strongly performed. The outer surface of the opposing extending portion may be disposed at a position lower, in the height direction, than the surface disposed at the end portion, on the opposing extending portion side in the lateral width direction, of the pressing surface of the pressing body portion for pressing the wire harness. Also in this case, the binding member such as tape having an adhesive surface on the back surface can be adhered to at least the outer surface of the wire harness without raising the binding member. Therefore, binding and holding can be strongly performed. Thus, in the configuration in which the outer surface of the opposing extending portion is formed at the same height as or a height lower than the level of the pressing surface of the pressing body portion, the above-described protrusion is consequently formed, and both the effects can be advantageously achieved at the same time.

DESCRIPTION OF THE PREFERRED EMBODIMENTS

A first embodiment of this invention will be described below with reference to the drawings.

Figure 1:
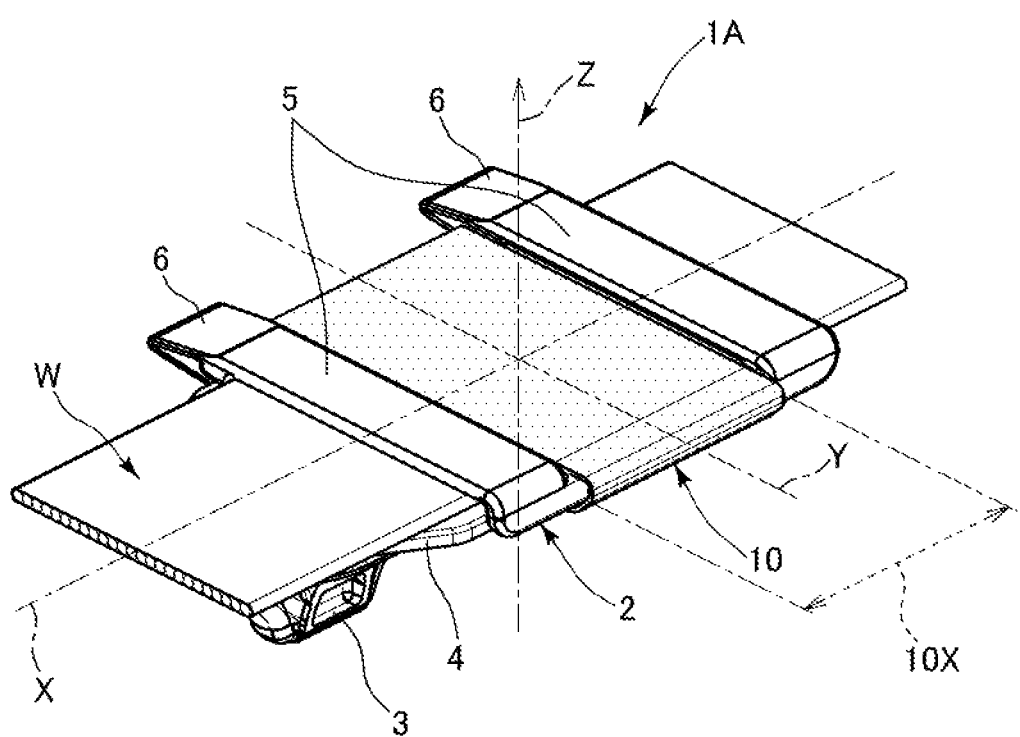
FIG. 1 is a perspective view of a binding structure of a wire harness according to a first embodiment, illustrating a state where a thin wire harness is bound.
Figure 2:
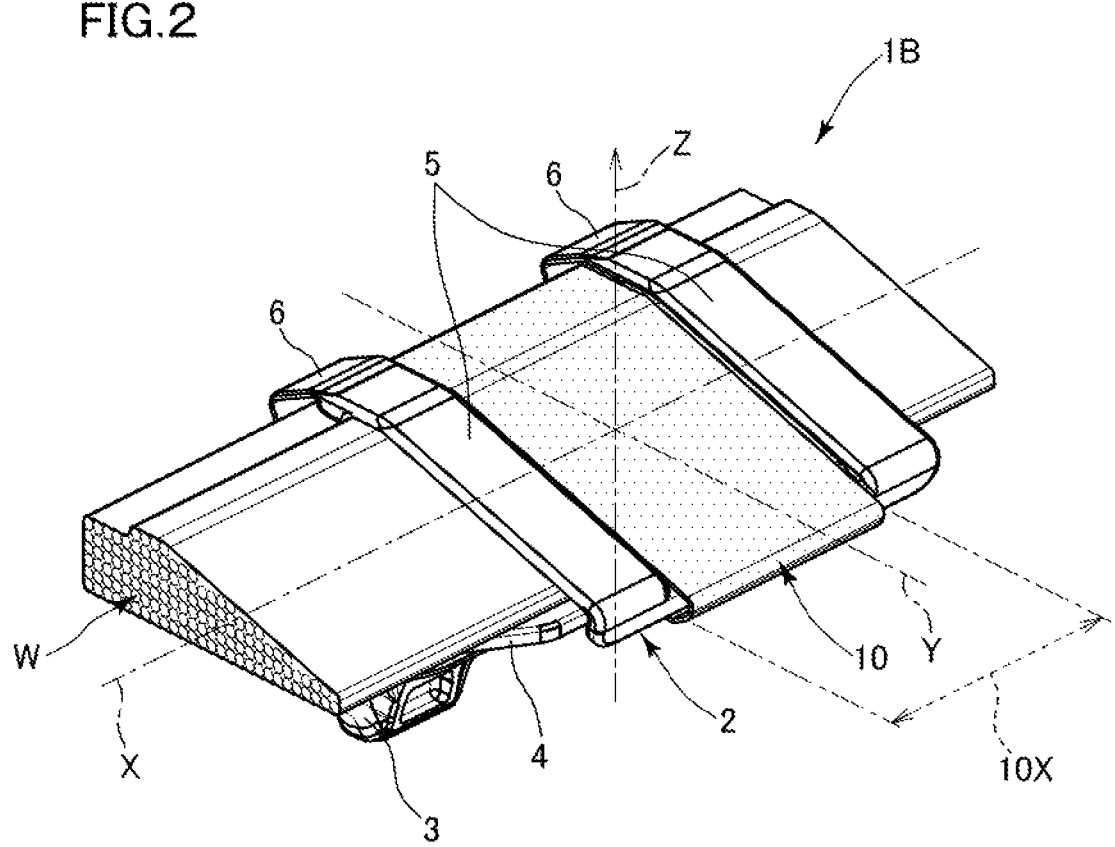
FIG. 2 is a perspective view of the binding structure of a wire harness according to the first embodiment, illustrating a state where a thick wire harness is bound.

A binding structure 1A, 1B of a wire harness according to the first embodiment includes a wire harness W (see FIG. 5 and FIG. 10) having a round cross-section, a clamp 2 that has an engagement portion 3 for attachment to a vehicle body, and press-deforms the wire harness W and press-expands the wire harness W in a lateral width direction Y to grip the wire harness W in a state where the wire harness W has a reduced height, and a binding member 10 for binding and holding a part of the clamp 2 and the wire harness W gripped by the clamp 2, as shown in FIG. 1 and FIG. 2.

Figure 5:
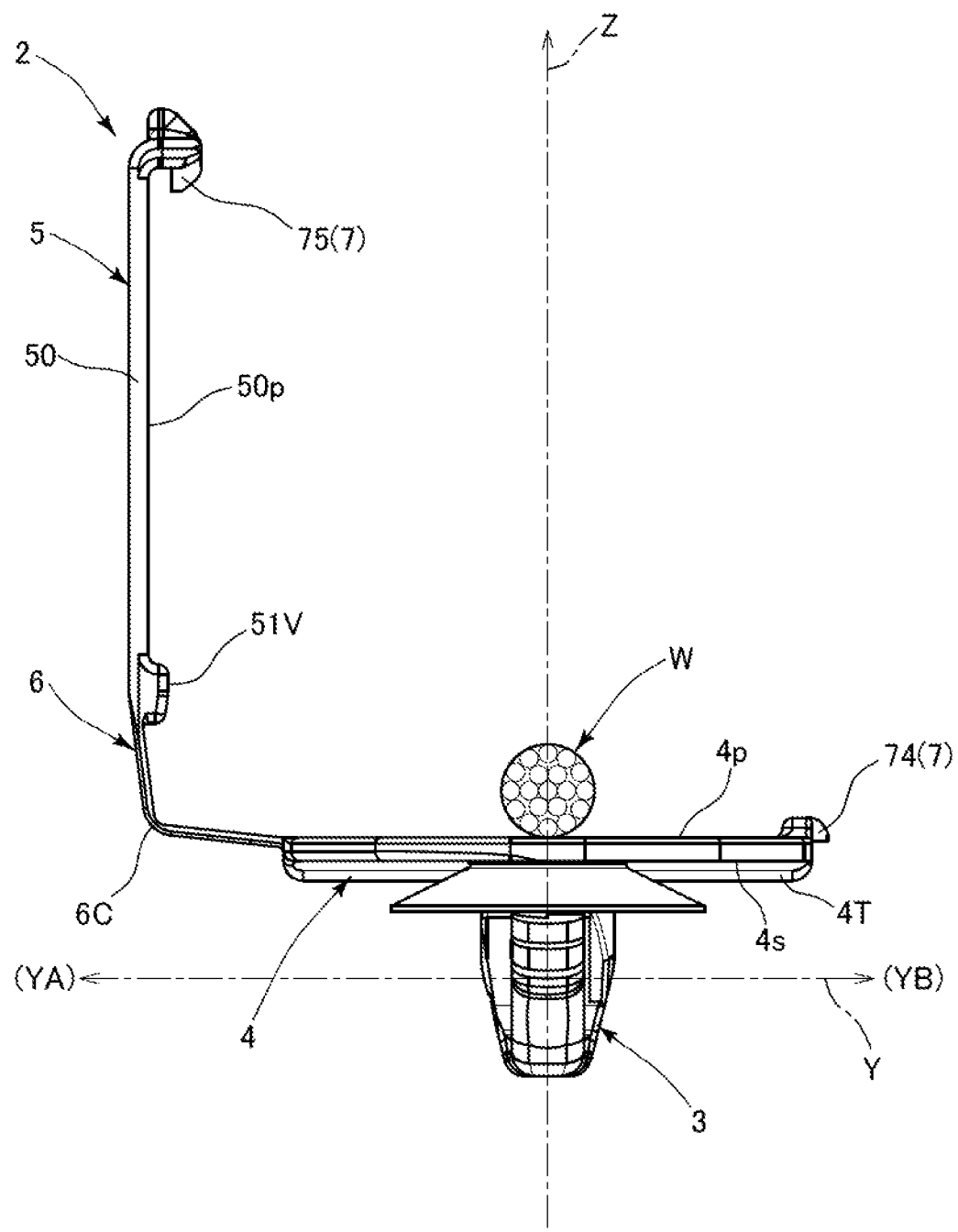
FIG. 5 illustrates a procedure for forming the binding structure shown in FIG. 1 with reference to a side view.
Figure 10:
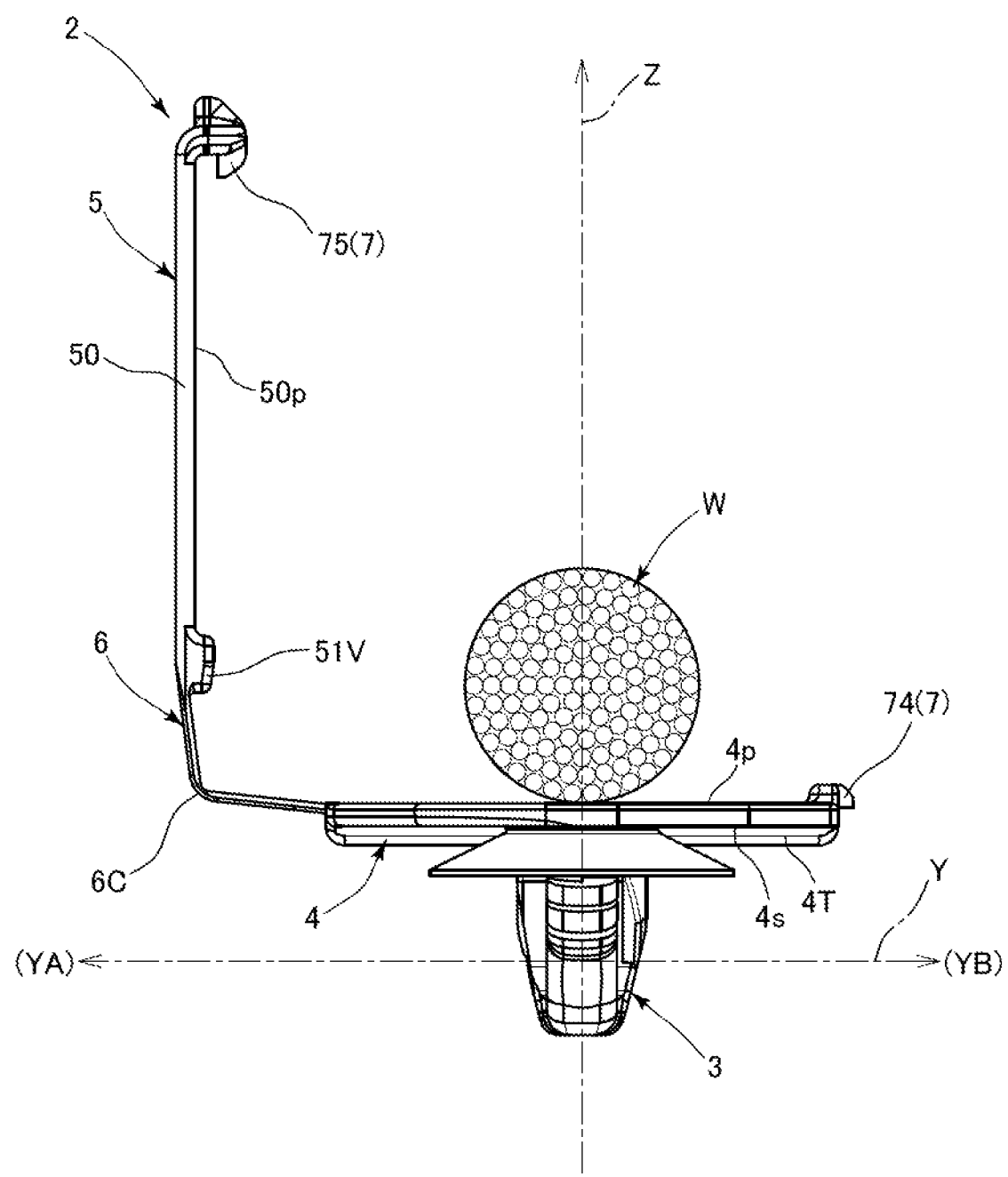
FIG. 10 illustrates a procedure for forming the binding structure shown in FIG. 2 with reference to a side view.

The wire harness W is a known flexible wiring bundle that is formed of multiple wires such as a signal line and a power supply line, and that has a round cross-section (see FIG. 5 and FIG. 10). When the binding structure 1A, 1B of the wire harness has been formed, the wire harness W is press-deformed and expanded in the lateral width direction and is in a low height state where the wire harness W has a reduced height (see FIG. 1 and FIG. 2). The wire harness W of this invention is different from, for example, a flat cable and flat-plate-shaped wiring that originally have a low height before the binding structure is formed.

Figure 3:
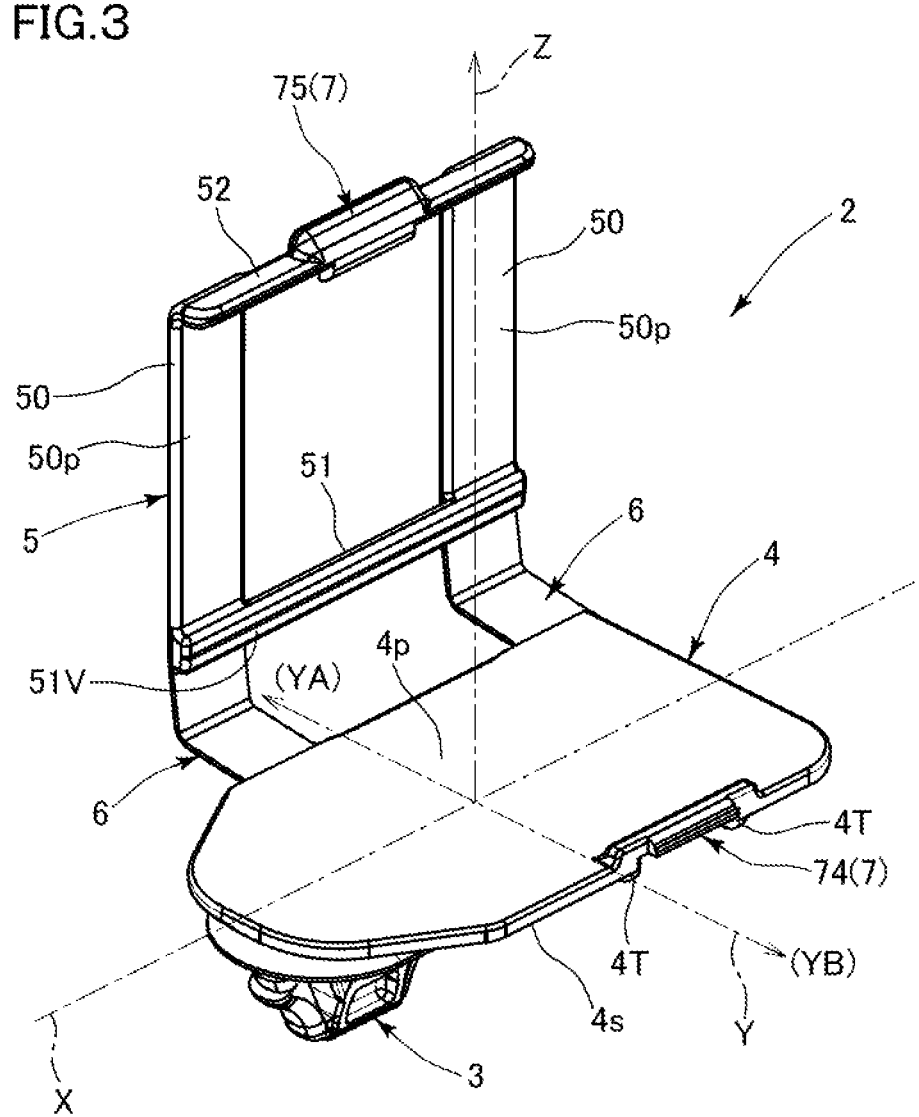
FIG. 3 is a perspective view of a clamp used for the binding structure according to the first embodiment.

The clamp 2 integrally has a placement portion 4, a pressing portion 5, a joining portion 6, a combining portion 7, and the above-described engagement portion 3, as shown in FIG. 3.

Figure 4:
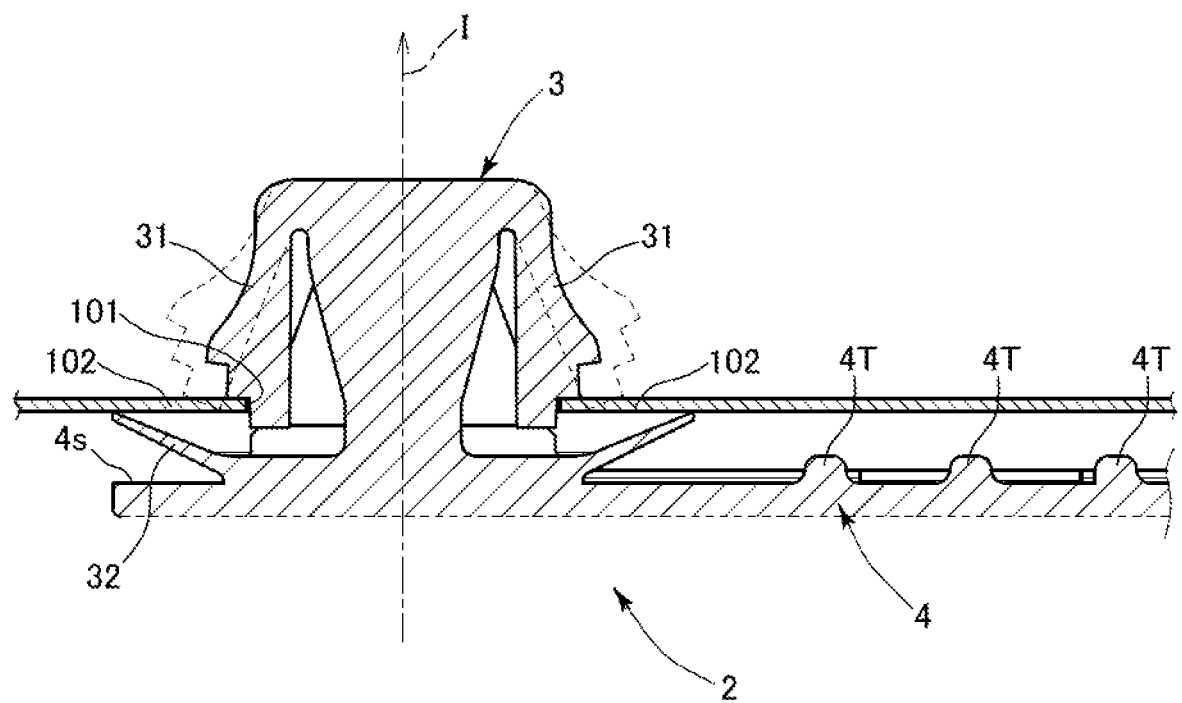
FIG. 4 is a cross-sectional view illustrating an exemplary state where an engagement portion of the clamp used for the binding structure according to the first embodiment is fixed to a vehicle body.

In this embodiment, the engagement portion 3 is inserted in and lock-engaged with a fixing hole 101 disposed in the vehicle body, as shown in FIG. 4. The engagement portion 3 is formed so as to protrude from a back surface 4s on the back of a placement surface 4p of the placement portion 4. When the engagement portion 3 is inserted in the fixing hole 101, an elastic lock-engaging piece 31 lock-engages with a peripheral portion 102 of the fixing hole 101 from the depth side in an insertion direction I, the engagement portion 3 enters a disengagement preventing state, and the peripheral portion 102 is fixed between the elastic lock-engaging piece 31 and a dish-shaped portion 32.

The engagement portion 3 is formed on the back surface 4s (see FIG. 3) of the placement portion 4 at a position that is distant from a binding position (binding section) 10X of the binding member 10 and is closer to one side in a longitudinal direction X, as shown in FIG. 1 and FIG. 2.

The placement portion 4 is formed in a flat-plate-like shape and has the placement surface 4p on which the wire harness W having the round cross-section is placed, as shown in FIG. 5 and FIG. 10. The placement surface 4p is a flat surface. The width of the placement surface 4p is greater than that of the wire harness W having the round cross-section, in the lateral width direction Y, whereas the width of the wire harness W in the longitudinal direction X is greater than the lateral width of the placement surface 4p, as shown in FIG. 3.

In the following description, the length direction of the wire harness W placed on the placement surface 4p is defined as the longitudinal direction X, the vertical direction extending from the placement surface 4p is defined as a height direction Z, and the width direction, of each of the placement surface 4p and the wire harness W, which is orthogonal to the longitudinal direction X and the height direction Z is defined as the lateral width direction Y. In this embodiment, the placement surface 4p is on a plane parallel to a plane including the longitudinal direction X and the lateral width direction Y.

Figure 6:
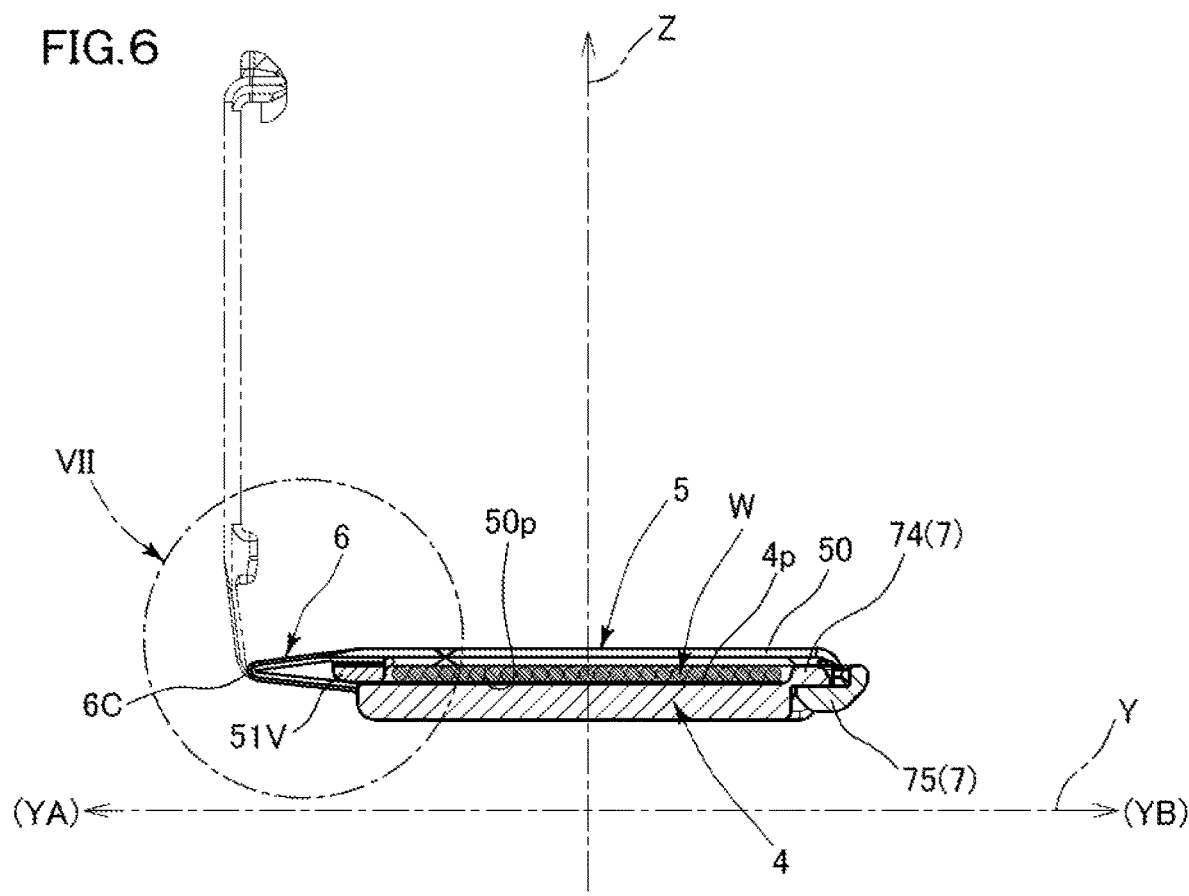
FIG. 6 illustrates a procedure subsequent to that in FIG. 5.
Figure 11:
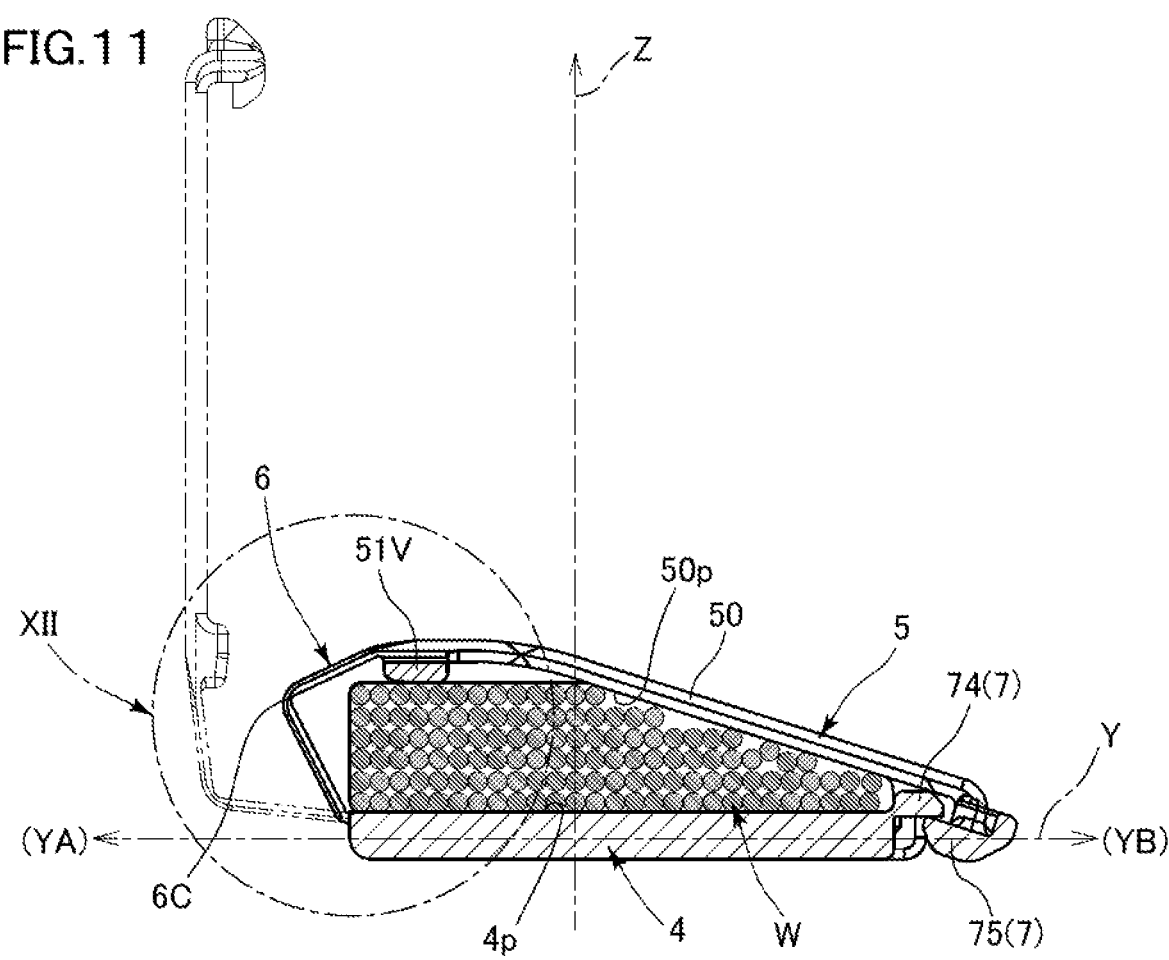
FIG. 11 illustrates a procedure subsequent to that in FIG. 10.

The pressing portion 5 presses the wire harness W having the round cross-section on the placement surface 4p shown in FIG. 5 and FIG. 10 against the placement surface 4p as shown in FIG. 6 and FIG. 11. Thus, the pressing portion 5 allows the wire harness W to be press-expanded in the lateral width direction Y on the placement surface 4p and thus allows the wire harness W to be in a low height state (flattened state) in which the wire harness W has a reduced height. In this embodiment, the pressing portion 5 integrally has pressing body portions 50, 50 and opposing extending portions 51, 52, as shown in FIG. 3.

Figure 8:
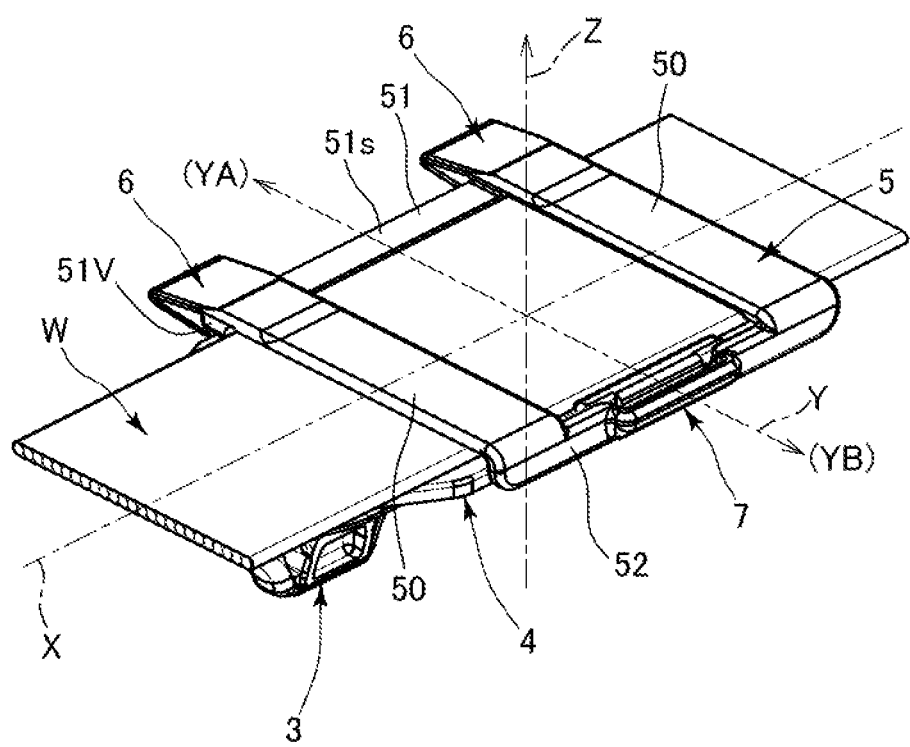
FIG. 8 is a perspective view corresponding to FIG. 6.
Figure 13:
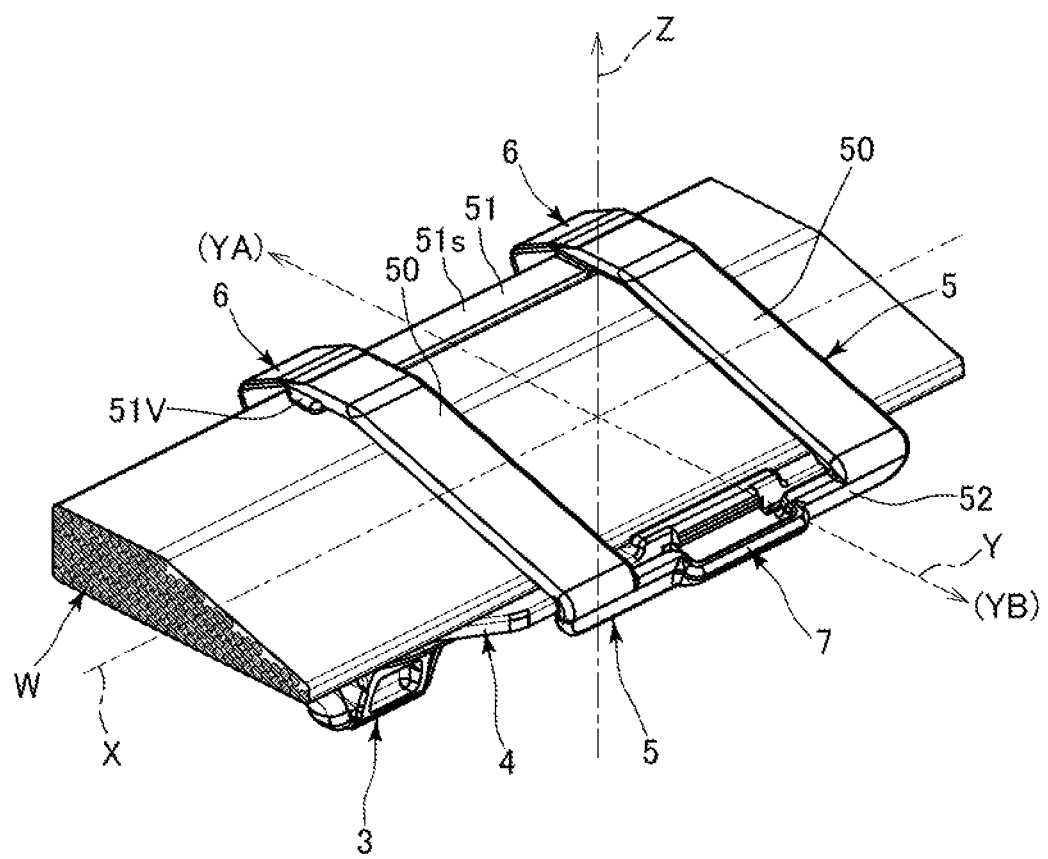
FIG. 13 is a perspective view corresponding to FIG. 11.

The pressing body portions 50, 50 are paired so as to oppose each other in the longitudinal direction X of the wire harness W placed on the placement surface 4p (see FIG. 6 and FIG. 11), as shown in FIG. 8 and FIG. 13, and each have a flat-plate-like shape that is thinner than the placement portion 4. The pressing body portions 50, 50 are disposed such that the wire harness W (see FIG. 5, FIG. 10) having the round cross-section on the placement surface 4p is disposed between the pressing body portions 50 and 50. The pressing body portions 50, 50 press the wire harness W so as to be held between the placement portion 4 and the pressing body portions 50, 50, so that the wire harness W can enter the low height state (flattened state).

In this embodiment, the pressing body portions 50, 50 have stiffness lower than that of the placement portion 4, and are flexible. Thus, as shown in FIG. 11, the pressing body portions 50, 50 can be bent in their extending direction along the outer surface of the wire harness W in a case where the wire harness W has a large diameter.

The opposing extending portions 51, 52 each extend from the paired pressing body portions 50, 50 so as to approach, as shown in FIG. 3. In this embodiment, the opposing extending portions 51, 52 each serve as a bridging portion for joining the paired pressing body portions 50, 50 to each other in the longitudinal direction X.

The opposing extending portion 51 extends in the longitudinal direction X from a part of the entire section, in the extending direction (lateral width direction Y), of the paired pressing body portions 50, 50, as shown in FIG. 8 and FIG. 13. In this embodiment, the opposing extending portion 51 is disposed so as to be closer to one end side (YA), in the lateral width direction Y, of the paired pressing body portions 50, 50, specifically, at the end portion on the one end side (YA). The opposing extending portion 51 can press the wire harness W on the placement surface 4p against the placement surface 4p in conjunction with the pressing body portions 50, 50.

Figure 14:
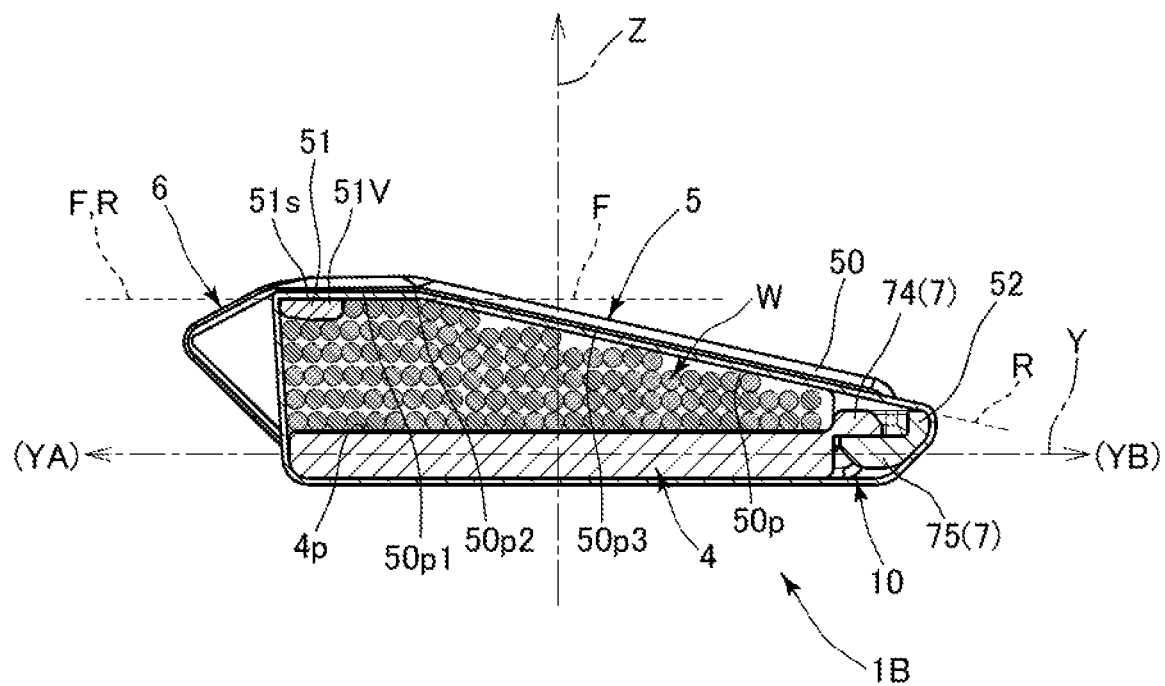
FIG. 14 illustrates a procedure subsequent to that in FIG. 11.

The pressing portion 5 has a protrusion 51V that protrudes toward the placement surface 4p from pressing surfaces 50p of the pressing body portions 50, 50 for pressing the wire harness W as shown in FIG. 3. As shown in FIG. 14, when the pressing body portions 50, 50 press the wire harness W on the placement surface 4p against the placement surface 4p, the protrusion 51V can be intruded onto the wire harness W. In this embodiment, the protrusion 51V is disposed to extend in the longitudinal direction X (see FIG. 3) on the opposing extending portion 51 and the pressing body portions 50, 50 on both outer sides of the opposing extending portion 51.

Figure 7:
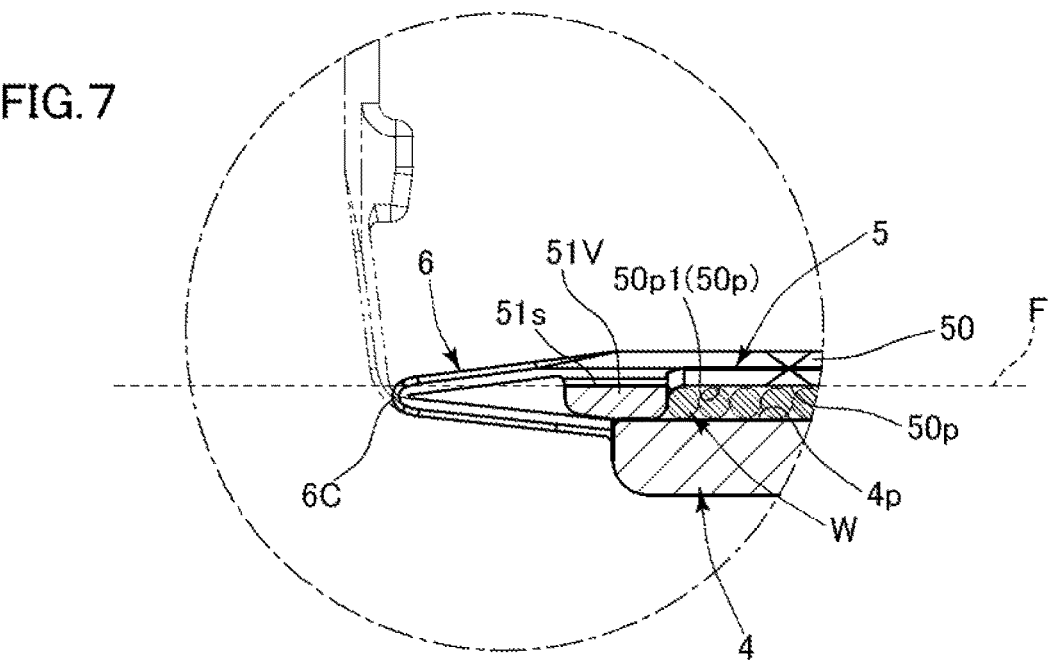
FIG. 7 is an enlarged view of a portion VII shown in FIG. 6.
Figure 12:
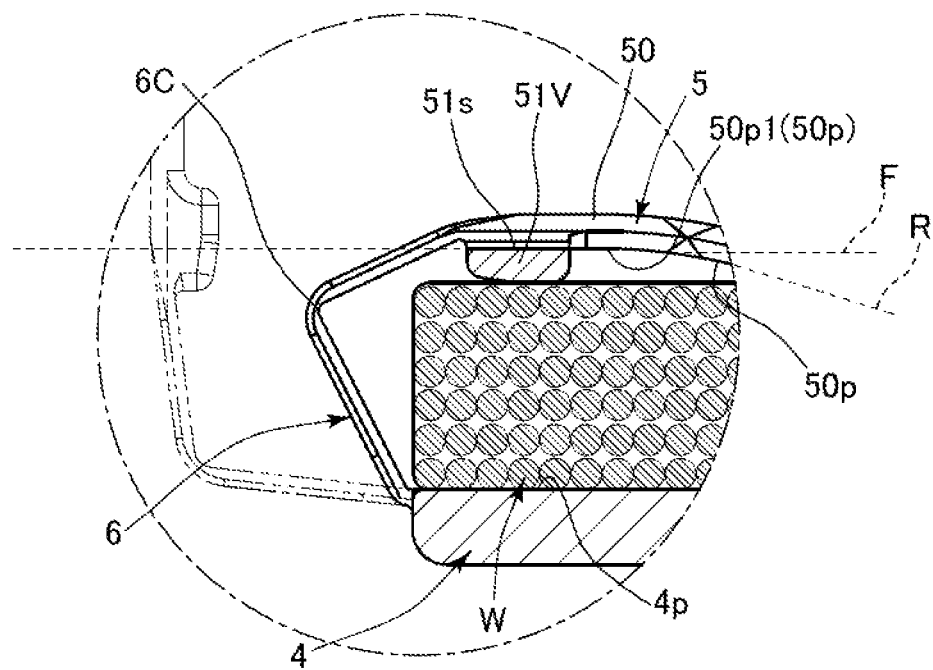
FIG. 12 is an enlarged view of a portion XII in FIG. 11.

In the opposing extending portion 51, as shown in FIG. 7 and FIG. 12, an outer surface 51s on the side opposite to an inner surface (the protrusion 51V) disposed on a pressing side on which the wire harness W is pressed is disposed at the same position (height) in the height direction Z (see FIG. 6 and FIG. 11) as a surface 50p1 disposed at an end portion, on the opposing extending portion 51 side in the lateral width direction Y, of each of the pressing surfaces 50p of the pressing body portions 50, 50. In this embodiment, the outer surface 51s and the surface 50p1 are disposed on a coplanar surface F. Furthermore, in FIG. 7, the outer surface 51s and each of the pressing surfaces 50p are disposed on the coplanar surface F, and, in FIG. 12, the outer surface 51s and each of the pressing surfaces 50p are disposed on the same continuous surface R that is smoothly continuous.

The opposing extending portion 52 (see FIG. 3) is disposed at the other end side (YB) of the paired pressing body portions 50, 50 in the lateral width direction Y, on the outer side of the wire harness W on the placement surface 4p in the lateral width direction Y, as shown in FIG. 6 and FIG. 11. As shown in FIG. 3, the opposing extending portion 52 has a pressing-portion-side lock-engaging portion 75 described below at the center in the extending direction (the longitudinal direction X) of the opposing extending portion 52.

The joining portion 6 joins the placement portion 4 and the pressing portion 5 to each other at the one end side (YA) in the lateral width direction Y, as shown in FIG. 3. In this embodiment, the joining portions 6 are disposed so as to correspond to the paired pressing body portions 50, 50, respectively, such that the joining portions 6 are connected to the placement portion 4. The joining portion 6 is flexible such that the height from the placement portion 4 (placement surface 4p) to the pressing portion 5 can be changed at the one end side (YA) in the lateral width direction Y. Specifically, the joining portion 6 has one or more bendable portions that are bendable more easily than the other portions, in the length direction from the placement portion 4 to the pressing portion 5, such that the height from the placement portion 4 to the pressing portion 5 can be changed at the one end side (YA) more greatly than at the other end side (YB) in the lateral width direction Y.

In this embodiment, in the joining portion 6, a bendable portion 6C is mainly bent when a provisionally combined state is formed, as shown in FIG. 7 and FIG. 12. However, the joining portion 6 can be bent at the entirety of its section in the length direction. As a result, the position of the pressing portion 5 (pressing surface 50p) at the one end side (YA) in the lateral width direction Y (see FIG. 6 and FIG. 11) can be changed to a position that is higher than (more distant from the placement surface 4p) a position at the other end side (YB), in the height direction Z extending from the placement surface 4p.

The bendable portion 6C (first bendable portion) is formed at a section (a bendable portion in this embodiment) in the joining portion 6 from the placement portion 4 to the pressing portion 5, as shown in FIG. 7 and FIG. 12. The bendable portion 6C is most easily bendable in the entire section from the placement portion 4 to the pressing portion 5 due to its small thickness.

As shown in FIG. 5 and FIG. 10, in an unloaded state (non-bent and non-deformed state), the joining portion 6 extends outward (toward the one end side (YA)) from the placement portion 4 in the lateral width direction Y, and is bent at the leading portion in the height direction Z and connected to the pressing portion 5 such that the entirety of the joining portion 6 has a bent L-shape. The joining portion 6 is connected substantially linearly to the placement portion 4 in the lateral width direction Y, and is also connected substantially linearly to the pressing portion 5 in the substantially height direction Z.

The combining portion 7 can combine the placement portion 4 and the pressing portion 5 with each other at the other end side (YB) in the lateral width direction Y such that the placement portion 4 and the pressing portion 5 are in a provisionally combined state, as shown in FIG. 6 and FIG. 11. In this combination (provisionally combined state), the wire harness W in the low height state between the placement portion 4 and the pressing portion 5 can be held while being maintained in the low height state so as not to fall from the placement surface 4p. In this embodiment, the combining portion 7 has the pressing-portion-side lock-engaging portion 75 disposed at the pressing portion 5 and a placement-portion-side lock-engaging portion 74 disposed at the placement portion 4, at the other end side (YB) in the lateral width direction Y. The provisionally combined state is formed by continuously lock-engaging the lock-engaging portions 74, 75 with each other.

The pressing-portion-side lock-engaging portion 75 is formed as a lock-engaging claw that extends from the pressing portion 5 toward the placement portion 4 at the other end side (YB) in the lateral width direction Y in the provisionally combined state shown in FIG. 6 and FIG. 11, and that projects toward the one end side (YA) at the leading end side. Meanwhile, the placement-portion-side lock-engaging portion 74 is formed as a lock-engaging claw that projects from the placement portion 4 toward the pressing portion 5 at the other end side (YB) in the lateral width direction Y in the provisionally combined state, and that is moved, at the other end side (YB) in the lateral width direction Y, into a position higher than that of the pressing-portion-side lock-engaging portion 75 in the height direction Z.

Figure 9:
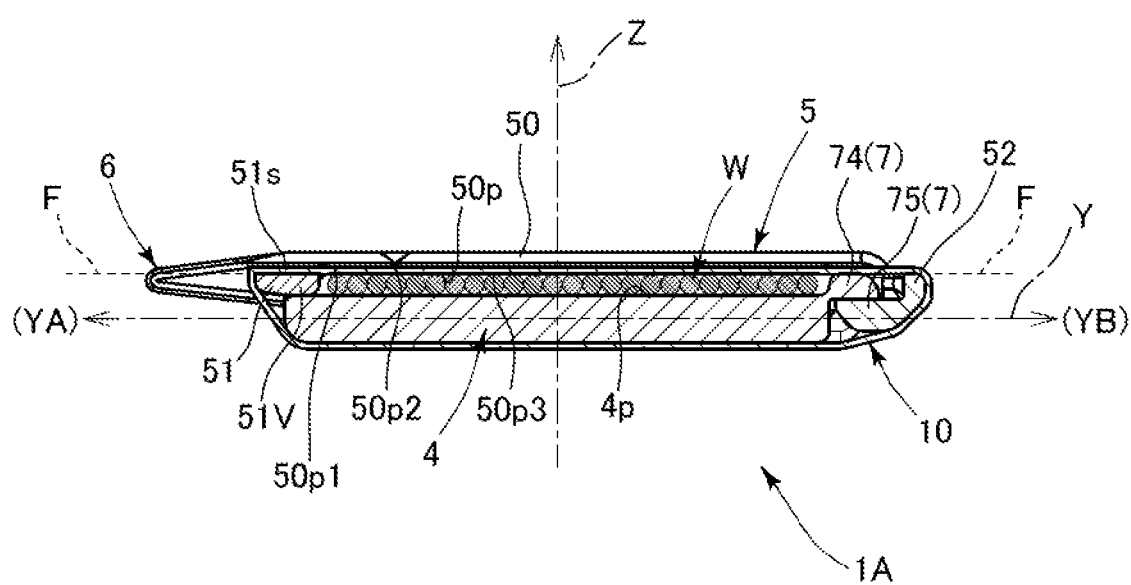
FIG. 9 illustrates a procedure subsequent to that in FIG. 6.

As shown in FIG. 9 and FIG. 14, the binding member 10 binds the wire harness W, the placement portion 4, and the opposing extending portion 51 between the paired pressing body portions 50, 50 opposing each other such that the wire harness W pressed into the low height state by the pressing portion 5 on the placement portion 4 (placement surface 4p (see FIG. 9 and FIG. 14)) as shown in FIG. 8 and FIG. 13 is pressed by the pressing portion 5 so as to have a further reduced height. In this embodiment, the binding member 10 is a flexible long member that is thinner than the pressing body portions 50, 50, and is a tape member in which a surface (inner peripheral surface in a state where an object to be bound is wound) on the side opposing the object to be bound is an adhesive surface.

A procedure for forming the binding structure of the wire harness shown in FIG. 1 and FIG. 2 will be described with reference to FIG. 5 to FIG. 9 and FIG. 10 to FIG. 14.

Firstly, as shown in FIG. 5 and FIG. 10, the wire harness W having the round cross-section is placed on the placement surface 4p of the placement portion 4.

Next, as shown in FIG. 6 and FIG. 7, and FIG. 11 and FIG. 12, the pressing portion 5 is tilted so as to bend and deform the joining portion 6 (mainly, the bendable portion 6C), and presses the wire harness W on the placement surface 4p against the placement surface 4p. Thus, the wire harness W having the round cross-section is held between the pressing portion 5 and the placement portion 4, and press-expanded on the placement surface 4p in the lateral width direction Y, to enter the low height state (flattened state) in which the wire harness W has a reduced height.

At this time, the pressing-portion-side lock-engaging portion 75 is moved downward of the placement-portion-side lock-engaging portion 74 to be in a lock-engaging state, thereby forming the provisionally combined state where the placement portion 4 and the pressing portion 5 are combined. Thus, the outer periphery of the wire harness W is annularly surrounded while the wire harness W remains in the low height state, and the wire harness W is held so as not to fall from between the placement portion 4 and the pressing portion 5.

When the pressing portion 5 is tilted as described above, the joining portion 6 is bent, thereby increasing the height on the one end side (YA) in the lateral width direction Y. Thus, the pressing-portion-side lock-engaging portion 75 can be moved more deeply onto the other end side (YB) in the lateral width direction Y, and the pressing-portion-side lock-engaging portion 75 can be moved downward of the placement-portion-side lock-engaging portion 74, to form the lock-engaging state (provisionally combined state).

In the provisionally combined state shown in FIG. 6, since the wire harness W has a small diameter, the protrusion 51V is in contact with the placement surface 4p. In the contact state, an external force for pressing the pressing portion 5 downward is intentionally caused to continuously act. When the external force is canceled, the bending of the bendable portion 6C is released, and the placement portion 4 and the pressing portion 5 are separated from each other at the one end side (YA) in the lateral width direction Y. Furthermore, by bending the entirety of the joining portion 6, the placement portion 4 and the pressing portion 5 can be more greatly separated from each other at the one end side (YA). That is, the provisionally combined state shown in FIG. 6 is a state where, by bending the joining portion 6, the height from the placement portion 4 (placement surface 4p) to the pressing portion 5 can be changed at the one end side (YA) in the lateral width direction Y.

Meanwhile, in the provisionally combined state shown in FIG. 11, since the wire harness W has a large diameter, the protrusion 51V comes into contact with the wire harness W, and does not come into contact with the placement surface 4p. The joining portion 6 that is bent in order to form the provisionally combined state (lock-engaging state) cannot be returned to the same state as shown in FIG. 10, the bent state is maintained, and the height of the pressing portion 5 relative to the placement portion 4 is maintained so as to maintain the provisionally combined state, by the bendable portion 6C (may not necessarily be bent). In this state, an external force for pressing the pressing portion 5 downward is caused to act, whereby the protrusion 51V is caused to intrude onto the wire harness W so as to bend the joining portion 6, and the pressing surface 50p can be in contact with the wire harness W. That is, the provisionally combined state shown in FIG. 11 is also a state where, by bending the joining portion 6, the height from the placement portion 4 (placement surface 4p) to the pressing portion 5 can be changed at the one end side (YA) in the lateral width direction Y.

In the provisionally combined state shown in FIG. 11, the paired pressing body portions 50, 50 are bent so as to be in close contact with the outer surface of the wire harness W in the extending direction of each of the pressing body portions 50, 50. This deformation also contributes to change of the height from the placement portion 4 (placement surface 4p) to the pressing portion 5 at the one end side (YA) in the lateral width direction Y in the provisionally combined state shown in FIG. 11.

Thus, in the provisionally combined state shown in FIG. 6 and FIG. 11, the joining portion 6 is bent, furthermore, the pressing body portions 50, 50 are bent to allow the height from the placement portion 4 (placement surface 4p) to the pressing portion 5 to be changed on the one end side (YA) in the lateral width direction Y. The binding member 10 (see FIG. 9 and FIG. 14) firmly binds the wire harness W, the placement portion 4, and the opposing extending portions 51, 52 between the paired pressing body portions 50, 50 opposing each other so as to prohibit the height from being changed. This binding prohibits the height from being changed between the placement portion 4 and the pressing portion 5 in a state where the wire harness W has a further reduced height, and the wire harness W is maintained by this binding so as to be in close contact with the placement portion 4 and the pressing portion 5. As a result, the binding structures 1A, 1B of the wire harness W shown in FIG. 1 and FIG. 2 are formed.

In the binding structure 1A shown in FIG. 1, the protrusion 51V comes into contact with the placement surface 4p, and the height from the placement portion 4 to the pressing portion 5 is smallest, as shown in FIG. 9. Since the outer surfaces 51s of the opposing extending portion 51 and the pressing surfaces 50p of the pressing body portions 50, 50 are disposed on the coplanar surface F, the binding member 10 forms a binding state so as to adhere both the outer surfaces 51s of the opposing extending portion and the outer surface of the wire harness W in a linearly continuous manner. In this binding state, the wire harness W having the round cross-section shown in FIG. 5 is maintained so as to have the lowest height.

In the binding structure 1B shown in FIG. 2, as shown in FIG. 14, the protrusion 51V is more greatly intruded onto the wire harness W, and the pressing surfaces 50p of the pressing body portions 50, 50 press the wire harness W, and the height from the placement portion 4 to the pressing portion 5 is maintained so as to be further reduced. The outer surfaces 51s of the opposing extending portion 51 and base-end side regions 50p1 of the pressing surfaces 50p, 50p are disposed on the substantially coplanar surface F. Therefore, the binding member 10 adheres both the outer surfaces 51s of the opposing extending portion 51 and the outer surface of the wire harness W in a linearly continuous manner. Furthermore, leading end side portions (the other end side (YB) in the lateral width direction Y) in front of the base-end side regions 50p1 of the pressing surfaces 50p, 50p are continuously formed as regions 50p2 that are smoothly curved so as to be continuous from the base-end side regions 50p1, and regions 50p3, in front of the regions 50p2, which are flat and tilted. The outer surface of the wire harness W pressed against the regions 50p2 and 50p3 similarly forms the continuous surface R. Therefore, the binding member 10 is pressed against the surfaces 50p1, 50p2, and 50p3, and is adhered to the outer surface of the wire harness W disposed on the continuous surface R similarly to the surfaces 50p1, 50p2, and 50p3. That is, the binding member 10 is adhered, in a binding state, over the outer surfaces 51s of the opposing extending portion 51 and the outer surface of the wire harness W that is smoothly continuous from the outer surfaces 51s without stepped portions. In the binding state, the wire harness W having the round cross-section shown in FIG. 10 is maintained so as to have the lowest height.

In the first embodiment, the combining portion 7 functions as a provisionally combining portion for provisionally combining the pressing portion 5 and the placement portion 4 between which the wire harness W in the low height state is gripped. The joining portion 6 functions as a height changing portion that allows the height from the placement surface 4p to the pressing portion 5 to be changed.

Furthermore, in the binding structures 1A, 1B according to the first embodiment, the height changing portion (joining portion 6) is disposed outward of the wire harness W placed on the placement surface 4p in the lateral width direction Y, specifically, disposed outward of the placement surface 4p in the lateral width direction Y. Therefore, the height changing portion itself does not increase the height of the binding structure 1A, 1B. The provisionally combining portion (combining portion 7) is also disposed outward of the wire harness W placed on the placement surface 4p in the lateral width direction Y, specifically, disposed outward of the placement surface 4p in the lateral width direction Y. Therefore, the provisionally combining portion itself does not increase the height of the binding structure 1A, 1B.

Furthermore, in the binding structures 1A, 1B according to the first embodiment, as shown in FIG. 4, projections 4T (ribs) extending in the lateral width direction Y are formed on the back surface 4s of the placement portion 4 in a region of a portion bound by the binding member 10 (see FIG. 9 and FIG. 14) between the pressing body portions 50, 50, and the binding member 10 formed as a tape member is adhered onto the projections 4T. In this embodiment, a plurality (three in this example) of the projections 4T are formed in the longitudinal direction X and have stiffness higher than those of the other regions so as not to bend the placement portion 4 by the binding force of the binding member 10.

Although one embodiment of this invention has been described above, the embodiment is merely illustrative, and this invention is not limited to the embodiment. Various modifications such as additions and omissions may be made based on the knowledge of a person skilled in the art without departing from the scope of the claims.

Hereinafter, embodiments other than the above-described embodiment and modifications of the above-described embodiment will be described. Portions having the same functions as those in the above-described embodiment are designated by the same reference characters and the detailed description thereof is omitted. In addition, the above-described embodiment, and the following modifications and other embodiments may be combined to be implemented as appropriate as long as no technical contradiction arises.

For example, the placement portion 4 and the pressing portion 5 may be separated from each other without providing the joining portion 6 and the combining portion 7.

Figure 22:
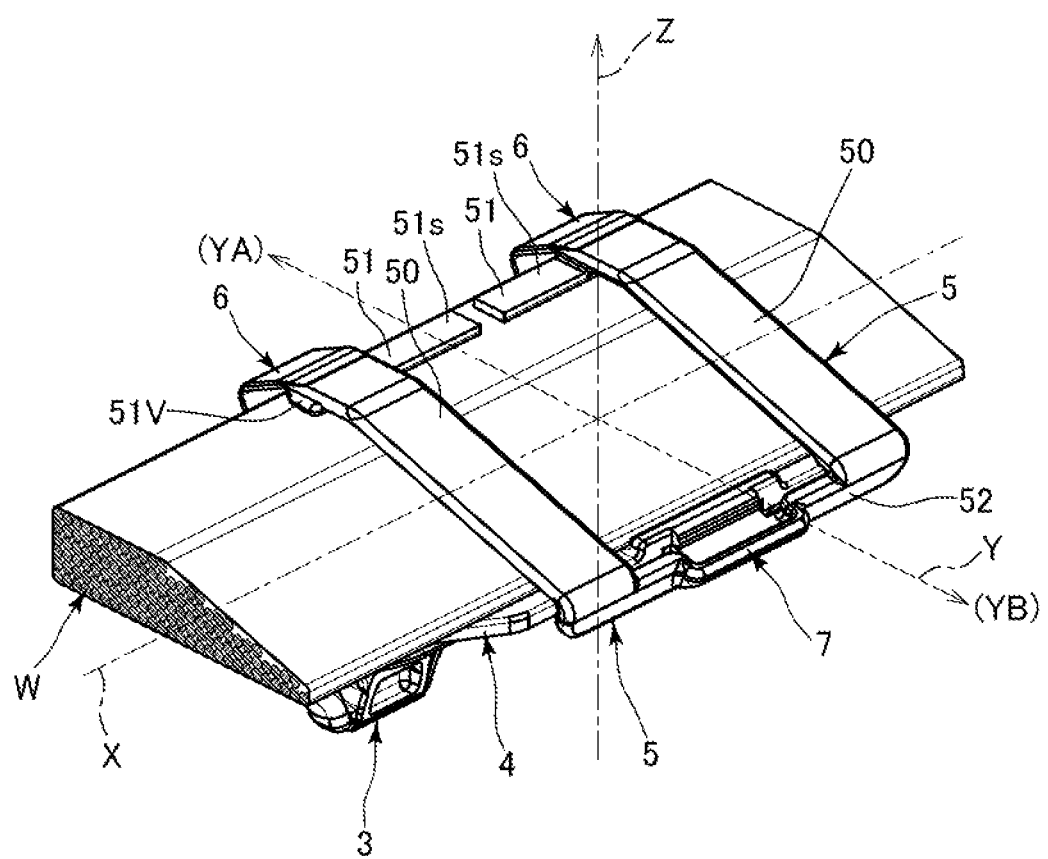
FIG. 22 is a perspective view of a provisionally combined state before binding of the binding member according to a first modification of the first embodiment.
Figure 23:
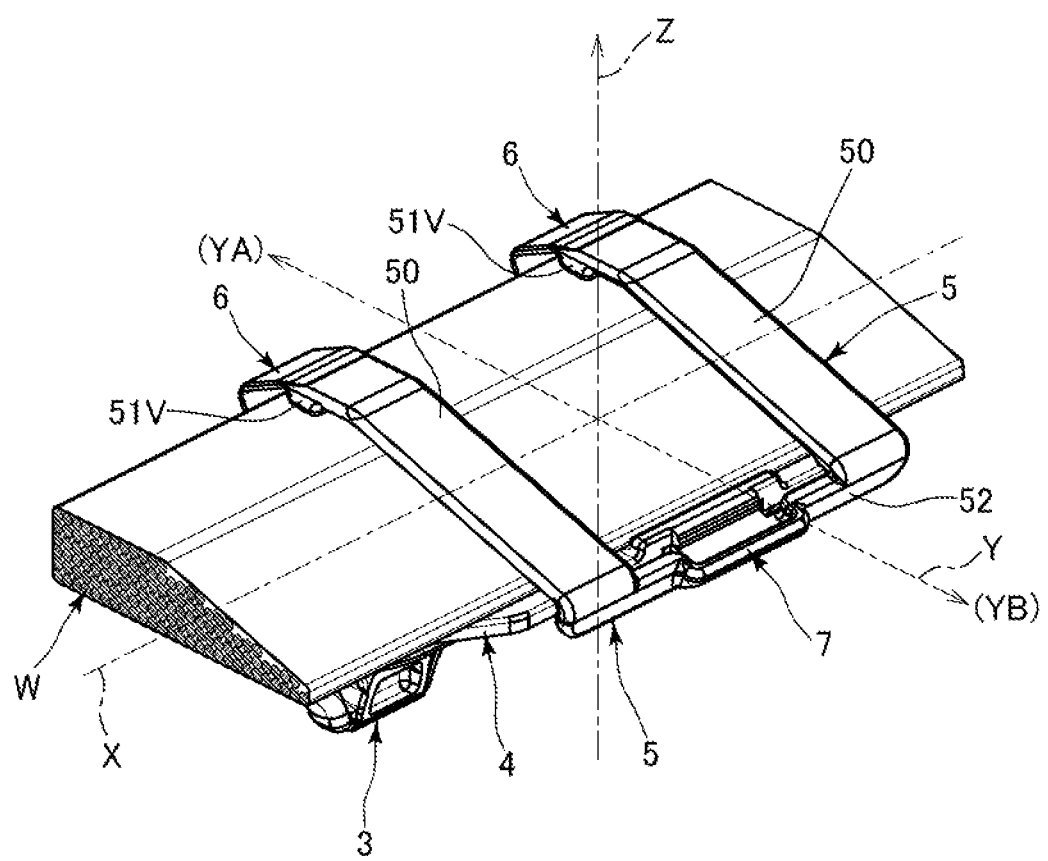
FIG. 23 is a perspective view of a provisionally combined state before binding of the binding member according to a second modification of the first embodiment.

The opposing extending portion 51 may not necessarily be a joined one when the opposing extending portion 51 extends from each of the paired pressing body portions 50 so as to approach as in the modification shown in FIG. 22. Furthermore, the number of the opposing extending portions disposed at the paired pressing body portions 50 may be at least one. For example, as in the modification shown in FIG. 23, the opposing extending portion 52 may be merely disposed without providing the opposing extending portion 51. Furthermore, the outer surface 51s of the opposing extending portion 51 may be disposed at a position lower, in the height direction Z, than the surface disposed at an end portion, on the opposing extending portion 51 side in the lateral width direction Y, of each of the pressing surfaces 50p of the pressing body portions 50, 50 for pressing the wire harness W. In this case, the binding member 10 having the back surface such as tape formed as an adhesive surface can be adhered to at least the outer surface of the wire harness W so as not to be raised.

Furthermore, the binding member 10 may not necessarily be a tape member, and may be a belt-like member such as a binding band. However, the tape-like member is preferable in consideration of the thickness (height).

A second embodiment of this invention will be described below with reference to the drawings.

Figure 15:
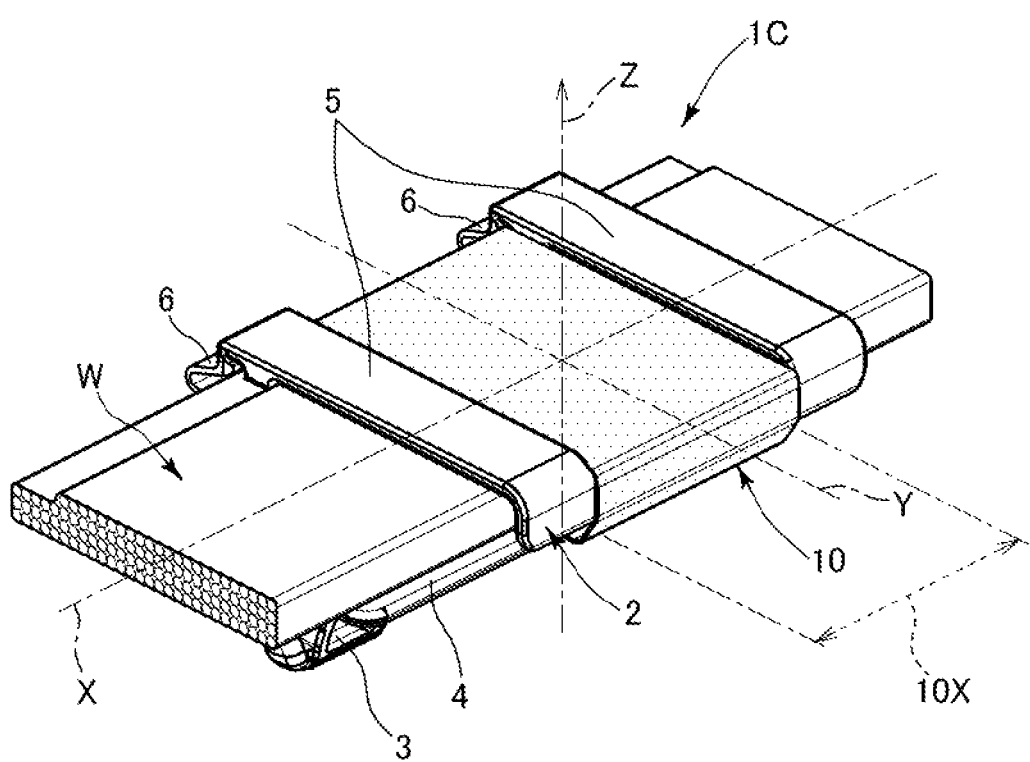
FIG. 15 is a perspective view of a binding structure of a wire harness according to a second embodiment.

A binding structure 1C of a wire harness according to the second embodiment also includes the wire harness W having the round cross-section, the clamp 2 that has the engagement portion 3 for attachment to a vehicle body, and press-deforms the wire harness W and press-expands the wire harness W in the lateral width direction Y to grip the wire harness W in a state where the wire harness W has a reduced height, and the binding member 10 for binding and holding a part of the clamp 2 and the wire harness W gripped by the clamp 2, as in the first embodiment, as shown in FIG. 15.

The wire harness W and the binding member 10 are the same as those in the first embodiment. Meanwhile, in the clamp 2 shown in FIG. 16, the pressing body portions 50, 50 of the pressing portion 5 have stiffness higher than that in the first embodiment and are less likely to be bent.

Figure 16:
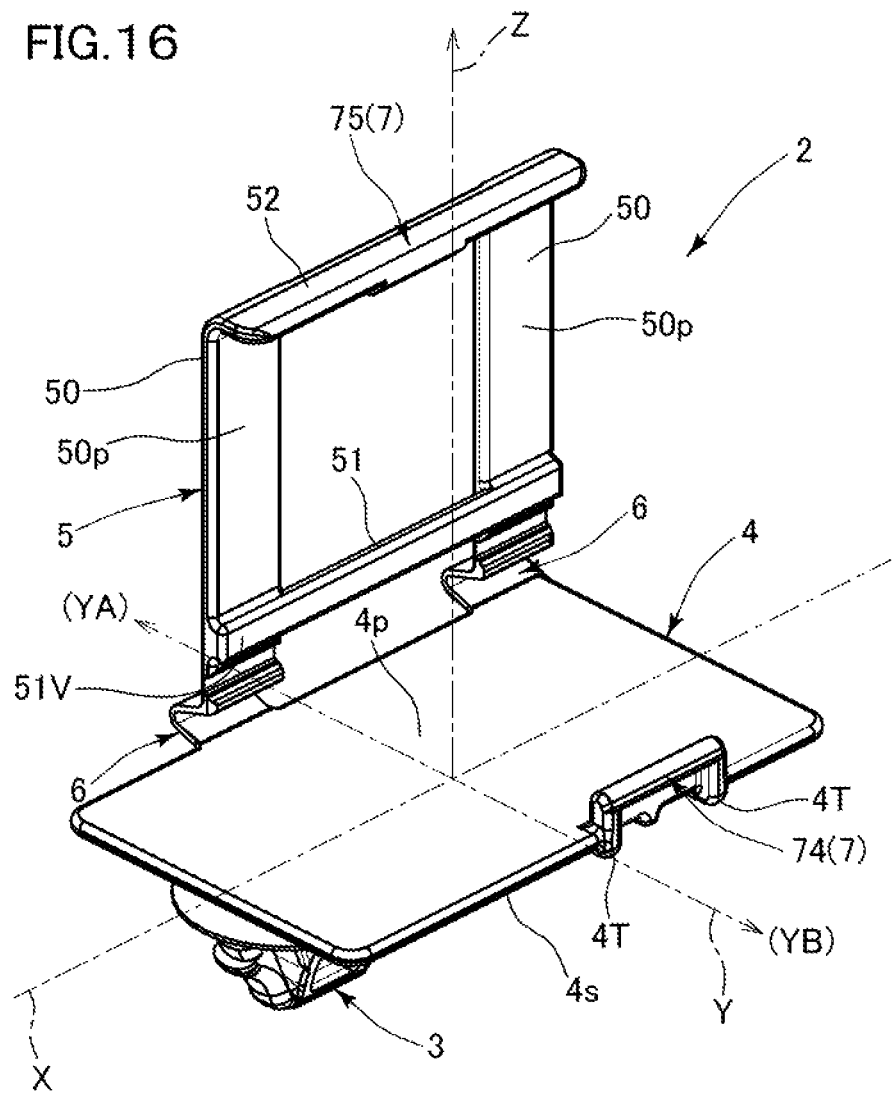
FIG. 16 is a perspective view of a clamp used for the binding structure according to the second embodiment.
Figure 17:
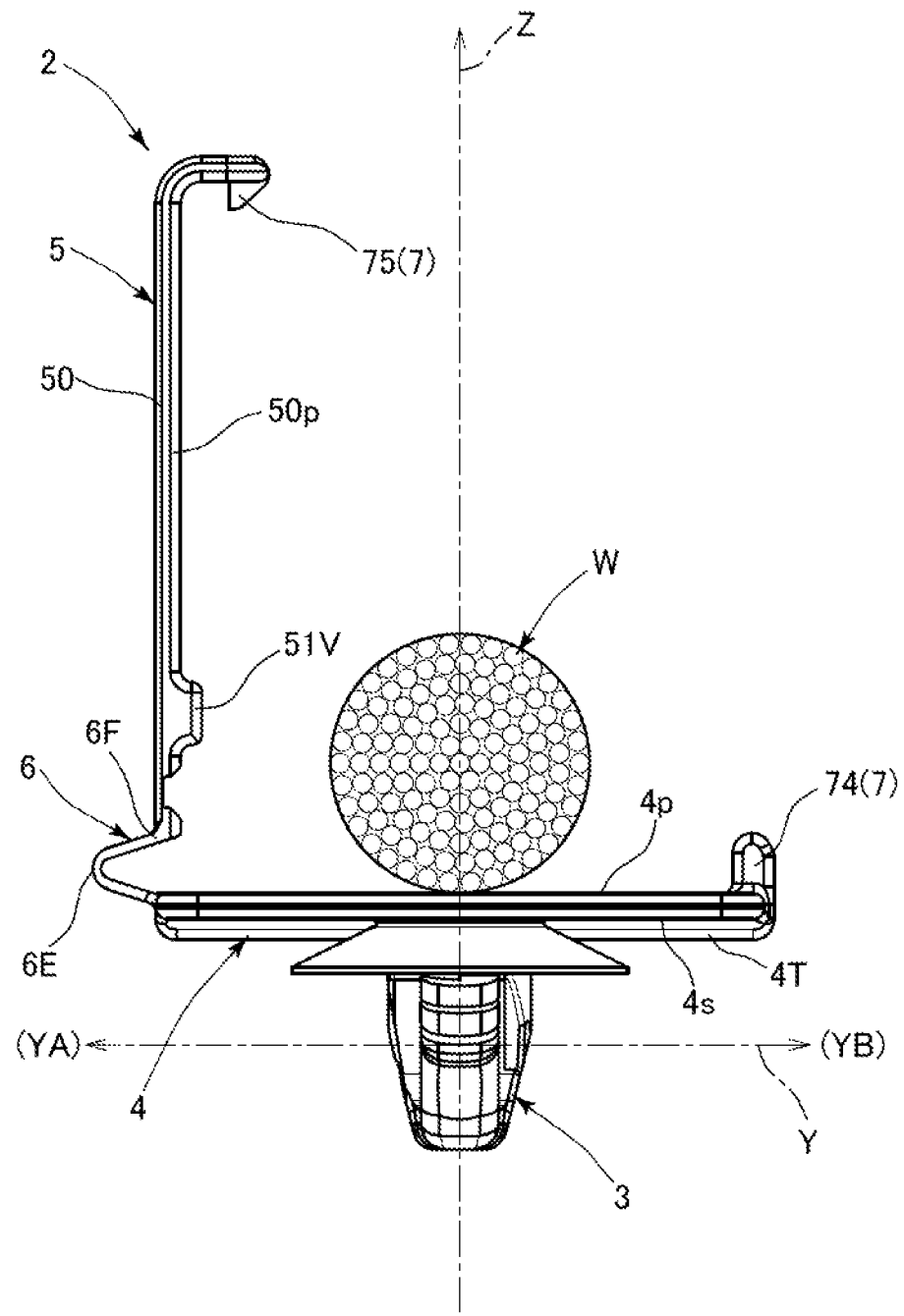
FIG. 17 illustrates a procedure for forming the binding structure shown in FIG. 15 with reference to a side view.
Figure 18:
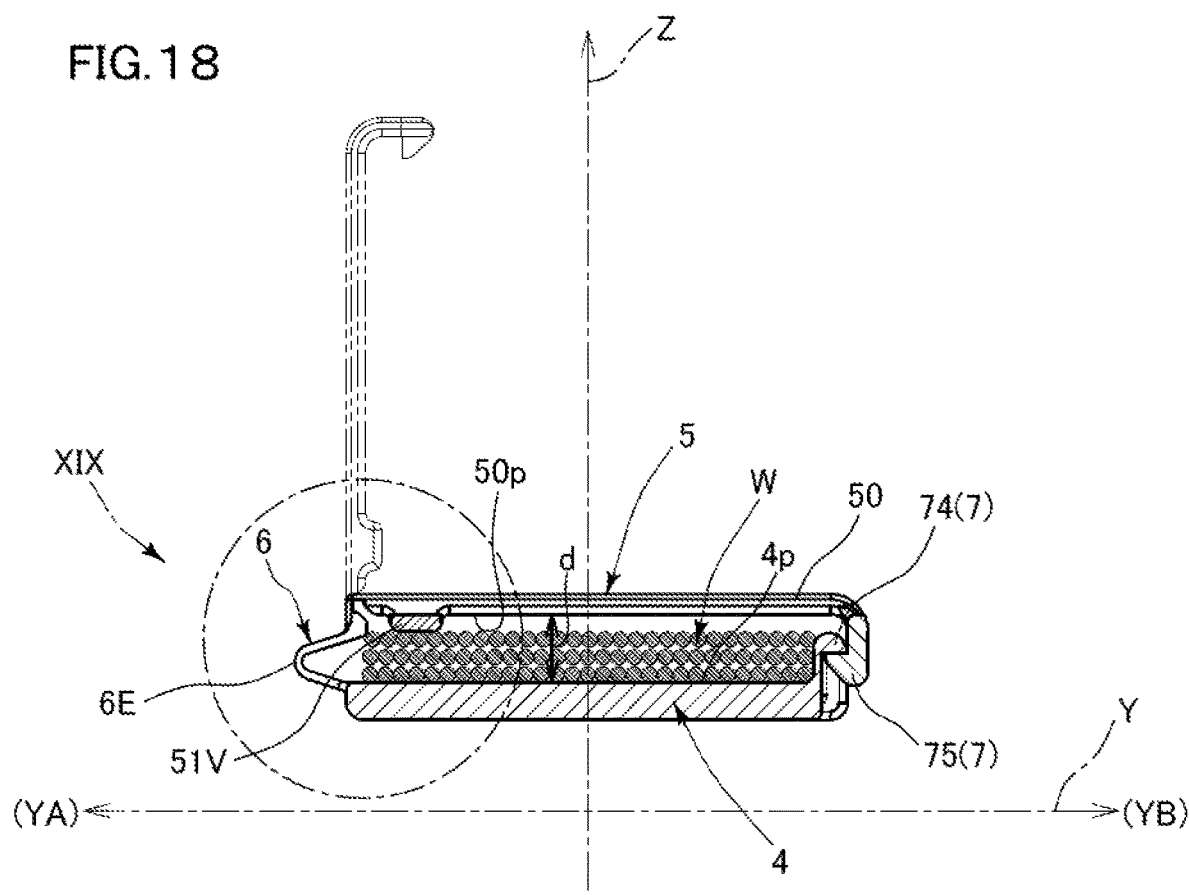
FIG. 18 illustrates a procedure subsequent to that in FIG. 17.
Figure 19:
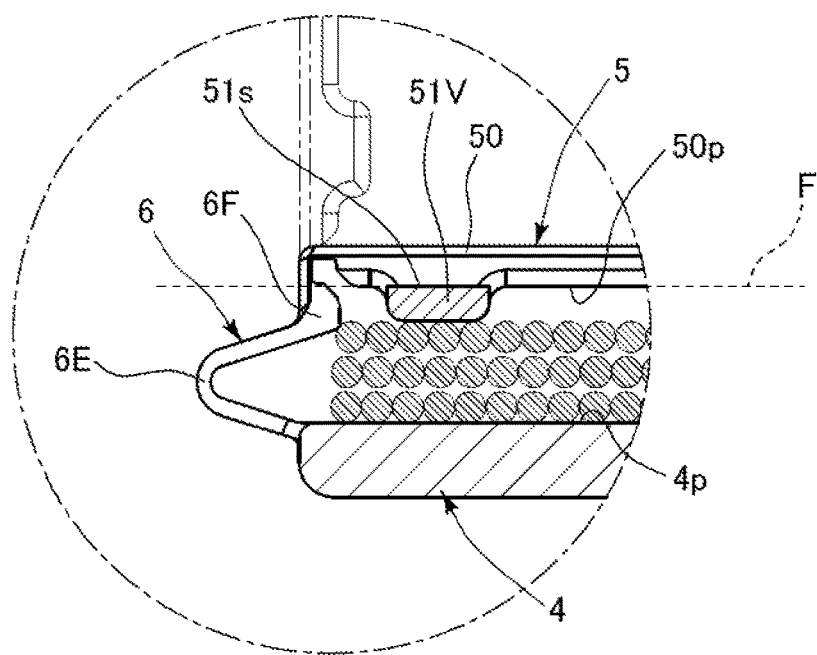
FIG. 19 is an enlarged view of a portion XIX shown in FIG. 18.

The joining portion 6 has a bendable portion 6E (one bendable portion 6E in this example) that is disposed at the one end side (YA) in the lateral width direction Y as shown in FIG. 16, and that is bendable more easily than the other portions from the placement portion 4 to the pressing portion 5 such that the height from the placement portion 4 to the pressing portion 5 can be changed, as shown in FIG. 17 to FIG. 19. By bending the bendable portion 6E for forming the provisionally combined state, the position of the pressing portion 5 can be changed in the height direction Z at the one end side (YA) in the lateral width direction Y. Specifically, the joining portion 6 extends outward from the placement portion 4 in the lateral width direction Y, is turned back at the leading portion thereof, and connected to the pressing portion 5 so as to form a U-like shape or a V-like shape (U-like shape in this example), and has, at the turned-back portion (specifically, the vertex portion), the bendable portion 6E as a bendable portion that allows the height to be changed at one end, in the lateral width direction Y, of the pressing portion 5. Meanwhile, a bendable portion 6F that is bendable more easily than the bendable portion 6E is disposed, as a bendable portion that does not act to change the height, at a portion connecting to the pressing portion 5. The bendable portion 6F functions as a pivot about which the pressing portion 5 can pivot.

The combining portion 7 has the pressing-portion-side lock-engaging portion 75 disposed at the pressing portion 5 and the placement-portion-side lock-engaging portion 74 disposed at the placement portion 4, at the other end side (YB) in the lateral width direction Y, as shown in FIG. 17 to FIG. 19. The lock-engaging portions 74, 75 are disposed so as to oppose each other in the height direction Z extending from the placement surface 4p, and can form the provisionally combined state as shown in FIG. 18. The lock-engaging portions 74, 75 in the provisionally combined state lock-engage with each other when the pressing portion 5 and the placement portion 4 are separated from each other over a predetermined distance d in the height direction Z at the other end side (YB), to prevent the pressing portion 5 from disengaging from the placement portion 4. Meanwhile, the position of the pressing portion 5 at the other end side (YB) can be changed in the height direction Z when the pressing portion 5 and the placement portion 4 are separated from each other within the predetermined distance d across a gap.

Thus, according to the second embodiment, both the joining portion 6 and the combining portion 7 function as the height changing portion that allows the height from the placement surface 4p to the pressing portion 5 to be changed. That is, the height between the placement portion 4 and the pressing portion 5 can be changed at both the one end side (YA) and the other end side (YB) in the lateral width direction Y.

A procedure for forming the binding structure 1C of a wire harness shown in FIG. 15 will be described with reference to FIG. 17 to FIG. 21.

Firstly, as shown in FIG. 17, the wire harness W having the round cross-section is placed on the placement surface 4p of the placement portion 4.

Next, as shown in FIG. 18 and FIG. 19, the pressing portion 5 is tilted and pivoted so as to mainly bend and deform the bendable portion 6F, to press the wire harness W on the placement surface 4p against the placement surface 4p. Thus, the wire harness W having the round cross-section is held between the pressing portion 5 and the placement portion 4, and is press-expanded on the placement surface 4p in the lateral width direction Y, to enter the low height state (flattened state) in which the wire harness W has a reduced height. Also in this case, the height is reduced to be less than or equal to ½ of the original height of the wire harness W having the round cross-section.

At this time, the pressing-portion-side lock-engaging portion 75 is moved downward of the placement-portion-side lock-engaging portion 74, and the lock-engaging portions 74 and 75 enter the lock-engaging state or the opposing state, to form the provisionally combined state where the placement portion 4 and the pressing portion 5 are combined with each other. Thus, the outer periphery of the wire harness W is annularly surrounded while the wire harness W remains in the low height state, and the wire harness W is thus held so as not to fall from between the placement portion 4 and the pressing portion 5.

When the pressing portion 5 is tilted and pivoted as described above, the bendable portion 6F that is most easily bent is bent earliest in the joining portion 6. In order to form the lock-engaging state from this state, the bendable portion 6E and the other portions of the joining portion 6 may be bent as necessary. Thus, the pressing-portion-side lock-engaging portion 75 can be moved more deeply onto the other end side (YB) in the lateral width direction Y, and the pressing-portion-side lock-engaging portion 75 can be moved downward of the placement-portion-side lock-engaging portion 74.

Figure 20:
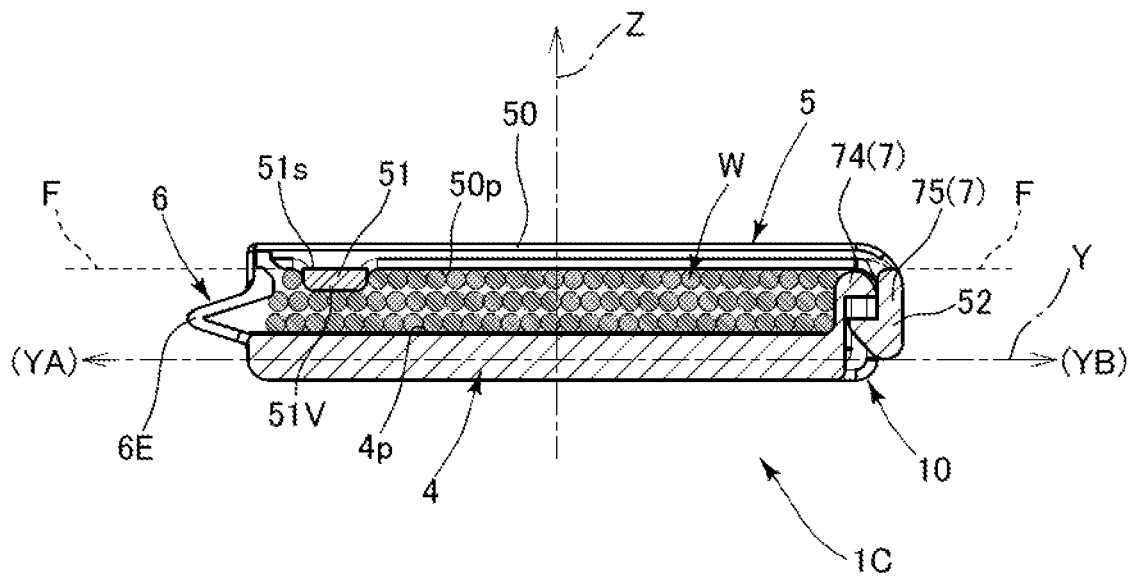
FIG. 20 illustrates a procedure subsequent to that in FIG. 18.

In the provisionally combined state shown in FIG. 18, since the wire harness W has a relatively small diameter, the protrusion 51V is not deeply intruded onto the wire harness W, and the pressing surface 50p does not come into contact with the wire harness W. Meanwhile, the lock-engaging portions 74, 75 lock-engage with each other. When an external force for pressing the pressing portion 5 downward is intentionally caused to act in this state, the protrusion 51V is deeply intruded onto the wire harness W as shown in FIG. 20, to form a state where the pressing surface 50p is in contact with the wire harness W. At this time, the bendable portion 6E is bent at the one end side (YA) in the lateral width direction Y, and the height from the placement portion 4 to the pressing portion 5 is reduced, and the lock-engaging portions 74, 75 are separated from each other and oppose each other across a gap at the other end side (YB).

Thus, in the provisionally combined state, the height from the placement portion 4 (placement surface 4p) to the pressing portion 5 can be changed at both the one end side (YA) and the other end side (YB) in the lateral width direction Y by bending the joining portion 6 (bendable portion 6E). Therefore, the binding member 10 firmly binds the wire harness W, the placement portion 4, and the opposing extending portions 51, 52 between the paired pressing body portions 50 opposing each other so as to prohibit the height from being changed. The height is prohibited, by this binding, from being changed between the placement portion 4 and the pressing portion 5 in a state where the wire harness W has a further reduced height, and the wire harness W is maintained so as to be in close contact with the placement portion 4 and the pressing portion 5. The binding structure 1C of the wire harness shown in FIG. 15 is formed by this binding.

Figure 21:
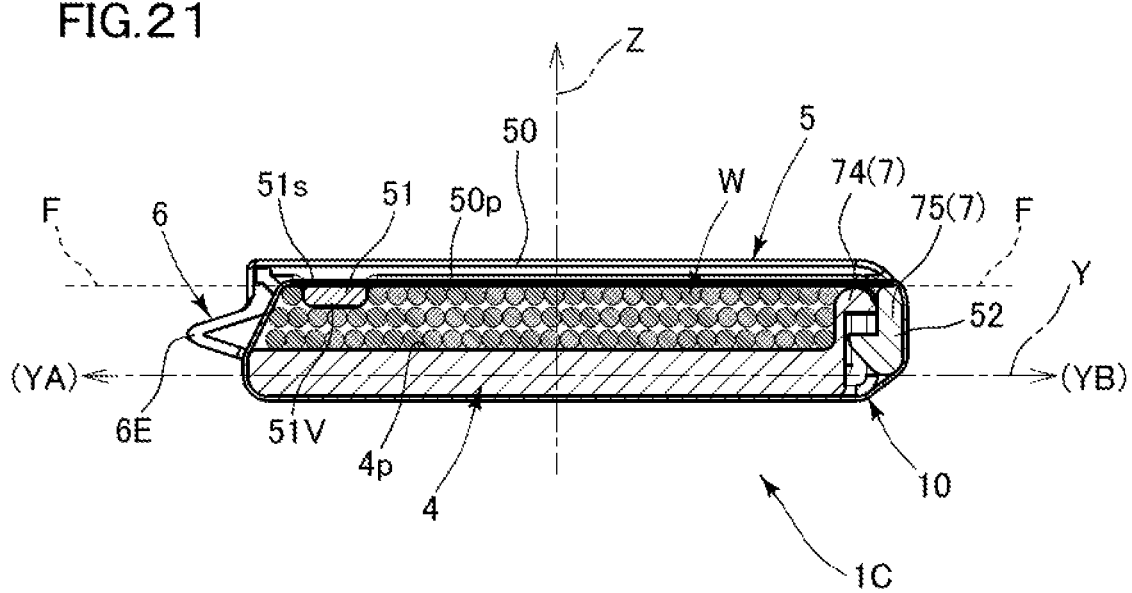
FIG. 21 illustrates a procedure subsequent to that in FIG. 20.

In the binding structure 1C of the wire harness shown in FIG. 15, the outer surfaces 51s of the opposing extending portion 51 are disposed on the continuous surface (the coplanar surface F in this example) that is smoothly continuous from the pressing surfaces 50p of the pressing body portions 50, 50 as shown in FIG. 21, so that the binding member 10 can adhere both the outer surfaces 51s of the opposing extending portion and the outer surface of the wire harness W pressed against the pressing surfaces 50p in a linearly continuous manner without stepped portions.

In a case where the wire harness W is thicker than that shown in FIG. 17, the protrusion 51V is deeply intruded onto the wire harness W in the provisionally combined state, and the pressing surfaces 50p may come into contact with the wire harness W, and the lock-engaging portions 74, 75 may continuously lock-engage with each other.

In the above-described embodiments, the drawings for the embodiments are schematically illustrated to a certain degree. Particularly, the number of the wires and disposition and arrangement of the wires in the wire harness W may not necessarily be exact as illustrated. For example, on the cross-section of each wire harness W, the wires in the wire harness W may also enter the inside of the joining portion 6 that is U-shaped or V-shaped, in the binding state of the binding member 10.

DESCRIPTION OF THE REFERENCE CHARACTERS 1A, 1B, 1C binding structure of wire harness
10 binding member
2 clamp
3 engagement portion
4 placement portion
4p placement surface
5 pressing portion
50 pressing body portion
50p pressing surface
51, 52 opposing extending portion
51V protrusion
51s outer surface
6 joining portion (height changing portion)

6C, 6E, 6F bendable portion
7 combining portion (provisionally combining portion)
74 placement-portion-side lock-engaging portion
75 pressing-portion-side lock-engaging portion
W wire harness
X longitudinal direction of wire harness
Y lateral width direction
Z height direction

What is claimed is:

1. A binding structure of a wire harness, the binding structure comprising:
a wire harness having a round cross-section;
a clamp having an engagement portion for attachment to a vehicle body, the clamp configured to press-deform the wire harness and press-expand the wire harness in a lateral width direction to grip the wire harness in a state where the wire harness has a reduced height in a height direction; and
a binding member configured to bind and hold a part of the clamp and the wire harness having been gripped, wherein
the clamp includes
a plate-shaped placement portion having a placement surface on which the wire harness is placed, the placement surface having a width greater than a width of the wire harness in the lateral width direction, and
a pressing portion having
a pair of pressing body portions that extend such that the wire harness placed on the placement surface is disposed between the pressing body portions, that are disposed so as to oppose each other in a longitudinal direction, and that press the wire harness against the placement surface and hold the wire harness to form a low height state where a height of the wire harness is reduced by press-expanding the wire harness on the placement surface in the lateral width direction, and
opposing extending portions extending from the pair of pressing body portions so as to approach, and
the binding member binds the wire harness in the low height state, the placement portion, and the opposing extending portions between the pair of pressing body portions opposing each other.

2. The binding structure of a wire harness according to claim 1, wherein
the clamp includes
a provisionally combining portion for forming a provisionally combined state where the placement portion and the pressing portion that grip the wire harness in the low height state are provisionally combined with each other, and
a height changing portion capable of changing a height from the placement surface to the pressing portion, and
the binding member binds the wire harness in the low height state, the placement portion, and the opposing extending portions in the provisionally combined state, to prohibit the height changing portion from changing the height.

3. The binding structure of a wire harness according to claim 2, wherein
the height changing portion has a flexible joining portion for joining the placement portion and the pressing portion at one end side in the lateral width direction,
the provisionally combining portion has a combining portion for combining the placement portion and the pressing portion at another end side in the lateral width direction, and
the wire harness, in the low height state, held between the placement portion and the pressing portion by the combining is held so as not to fall from the placement surface.

4. The binding structure of a wire harness according to claim 3, wherein
the combining portion has a pressing-portion-side lock-engaging portion disposed at the pressing portion and a placement-portion-side lock-engaging portion disposed at the placement portion, at the other end side, and the combining portion is capable of forming the provisionally combined state by continuously lock-engaging the lock-engaging portions with each other, and
the joining portion is disposed so as to be bent and deformed such that a height from the placement portion to the pressing portion is changeable at the one end side, and the joining portion allows a position of the pressing portion at the one end side to be changed to a position higher than a position at the other end side in a height direction extending from the placement surface by bending the joining portion when the provisionally combined state is formed.

5. The binding structure of a wire harness according to claim 3, wherein
the height changing portion has the joining portion and the combining portion,
the combining portion has a pressing-portion-side lock-engaging portion disposed at the pressing portion and a placement-portion-side lock-engaging portion disposed at the placement portion, at the other end side,
the lock-engaging portions are disposed so as to oppose each other in a height direction extending from the placement surface,
when the pressing portion and the placement portion are separated from each other at the other end side in the height direction over a predetermined distance, the lock-engaging portions lock-engage with each other to prevent the pressing portion from disengaging from the placement portion,
when the pressing portion and the placement portion are separated from each other within the predetermined distance, the provisionally combined state where a position of the pressing portion at the other end side can be changed in the height direction, can be formed, and
the joining portion is disposed so as to be bent and deformed such that a height from the placement portion to the pressing portion can be changed at the one end side, and a position of the pressing portion at the one end side can also be changed in the height direction by bending the joining portion when the provisionally combined state is formed.

6. The binding structure of a wire harness according to claim 5, wherein the joining portion extends outward from the placement portion in the lateral width direction, is turned back at a leading portion thereof, and connected to the pressing portion so as to form a U-like shape or V-like shape, and has a bendable portion at a turned-back portion, and has, at a portion connecting to the pressing portion, a bendable portion that functions as a pivot that allows the pressing portion to pivot.

7. The binding structure of a wire harness according to claim 1, wherein the opposing extending portions serve as a bridging portion for joining the paired pressing portions opposing each other in the longitudinal direction.

8. The binding structure of a wire harness according to claim 1, wherein the pressing portion has a protrusion that protrudes toward the placement surface from a pressing surface of each of the pressing body portions for pressing the wire harness.

9. The binding structure of a wire harness according to claim 1, wherein, in the opposing extending portions, an outer surface on a side opposite to an inner surface disposed on a pressing side on which the wire harness is pressed is disposed, in the height direction, at a same position as or a lower position than a surface disposed at an end portion, on the opposing extending portion side in the lateral width direction, of a pressing surface of each of the pressing body portions for pressing the wire harness.

10. The binding structure of a wire harness according to claim 1, wherein the engagement portion protrudes from a back surface of the placement surface of the placement portion, and is formed on the back surface at a position that is distant from a binding position of the binding member and is closer to one side in the longitudinal direction.

\* \* \* \* \*